US007684092B2

(12) United States Patent
Ishii

(10) Patent No.: US 7,684,092 B2
(45) Date of Patent: Mar. 23, 2010

(54) ELECTRO-OPTICAL DEVICE AND WRITING CIRCUIT OF ELECTRO-OPTICAL DEVICE

(75) Inventor: Tatsuya Ishii, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 1030 days.

(21) Appl. No.: 11/390,869

(22) Filed: Mar. 28, 2006

(65) Prior Publication Data

US 2006/0227090 A1 Oct. 12, 2006

(30) Foreign Application Priority Data

Apr. 11, 2005 (JP) ............................ 2005-113149
Jan. 31, 2006 (JP) ............................ 2006-021975

(51) Int. Cl.
*H04N 1/04* (2006.01)

(52) U.S. Cl. ....................... 358/474; 358/514; 358/483; 358/482; 345/98; 345/89; 348/294; 257/E27.113

(58) Field of Classification Search ................. 358/483, 358/474, 487, 509, 475, 514, 482; 345/98, 345/89, 87, 107, 204, 267, 265, 273; 365/185.24, 365/185.29; 359/267, 265, 273; 348/294, 348/221.1; 257/E27, E27.113, E29.568
See application file for complete search history.

(56) References Cited

U.S. PATENT DOCUMENTS

| | | | | |
|---|---|---|---|---|
| 6,636,194 | B2 * | 10/2003 | Ishii | 345/98 |
| 6,650,462 | B2 * | 11/2003 | Katase | 359/296 |
| 7,019,889 | B2 * | 3/2006 | Katase | 359/296 |
| 7,265,742 | B2 * | 9/2007 | Iisaka | 345/100 |
| 7,359,110 | B2 * | 4/2008 | Katase | 359/296 |
| 7,388,194 | B2 * | 6/2008 | Schneider et al. | 250/288 |
| 2002/0180675 | A1 * | 12/2002 | Tobita et al. | 345/87 |
| 2004/0051935 | A1 * | 3/2004 | Katase | 359/296 |
| 2005/0156841 | A1 * | 7/2005 | Aoki | 345/89 |
| 2007/0076106 | A1 * | 4/2007 | Kamon | 348/294 |

FOREIGN PATENT DOCUMENTS

| | | |
|---|---|---|
| JP | 2001-242832 A | 9/2001 |
| JP | 2004-177930 A | 6/2004 |

* cited by examiner

*Primary Examiner*—Negussie Worku
(74) *Attorney, Agent, or Firm*—AdvantEdge Law Group, LLC

(57) ABSTRACT

There is provided a writing circuit of an electro-optical device having a plurality of scanning lines, a plurality of data lines, and a plurality of pixels disposed to correspond to intersections between the plurality of scanning lines and the plurality of data lines. Here, each pixel comprises: a pixel capacitor having a pixel electrode and a common electrode opposed to the pixel electrode; and a switching element for electrically connecting the corresponding data line to the pixel electrode when the corresponding scanning line is selected. The writing circuit comprises an inversion circuit for maintaining a voltage between a potential of the data line and a predetermined potential for a predetermined time, and inverting the maintained voltage with respect to a reference potential and applying the inverted voltage to the data line after the lapse of the predetermined time, in a period of time when one scanning line of the plurality of scanning lines is selected.

8 Claims, 16 Drawing Sheets

RELATED ART

<READING>

<INVERTED REWRITING>

ELECTRO-OPTICAL DEVICE AND WRITING CIRCUIT OF ELECTRO-OPTICAL DEVICE

BACKGROUND

1. Technical Field

The present invention relates to a technology contributing to simplifying a configuration of an electro-optical device.

2. Related Art

Recently, projectors for forming a reduced image by the use of a display panel employing liquid crystal and enlarging and projecting the reduced image through an optical system are becoming increasing popular. The liquid crystal is alternately driven with a positive polarity and a negative polarity in principle, so as to prevent deterioration of the liquid crystal. In case of such alternate driving, the following 4 methods are considered to control writing polarities of pixels in a screen:

(1) scanning line inversion in which the writing polarity is inverted every scanning line (line inversion);

(2) data line inversion in which the writing polarity is inverted every data line (source inversion);

(3) pixel inversion in which the scanning line inversion and the data line inversion are combined and the writing polarity is inverted between the pixels adjacent to each other in all directions (dot inversion); and (4) surface inversion in which the writing polarity of a screen is inverted (frame inversion).

On the other hand, in any case of (1) to (4), the writing polarity is inverted with an interval of one or more vertical scanning period of time (frame).

In the scanning line inversion of (1), the data line inversion of (2), and the dot inversion of (3), the polarities of a pixel row and/or a pixel column spatially adjacent to each other are changed. Accordingly, even when the effective voltage values applied to the liquid crystal is different in polarity, the flickering resulting from the difference thereof is little recognized.

However, since gaps between the pixel electrodes are very small in a display panel on which the above-mentioned reduced image is displayed, a disclination (alignment failure) due to a so-called lateral electric field occurs in (1), (2), and (3). Accordingly, the surface inversion of (4) is effective when the gaps between the pixel electrodes are very small.

In the surface inversion of (4), when the inversion cycle is one vertical scanning period and attention is paid to the data lines in a column, the data signals having the same polarity are written to a column of pixels supplied through the corresponding data lines with the data signals in one vertical scanning period and the polarity of the data signals supplied to the data lines is inverted in the next vertical scanning period.

As a result, when the scanning lines are scanned from the upside to the downside in a display area, the data signal supplied to the data line of the relevant column is changed to the same polarity as that of the data signal written to the upper pixel in most of the non-selected period as seen from the upper pixel corresponding to the intersection between the scanning line located upside and the data line in the relevant column. However, the data signal supplied to the data line of the relevant column is changed to the polarity opposite to that of the data signal written to the lower pixel in most of the non-selected period as seen from the lower pixel corresponding to the intersection between the scanning line located downside and the data line in the relevant column.

Therefore, in the upper pixel and the lower pixel, the voltage of the data line in the sustain period differently affects the pixel electrodes, thereby making the display quality non-uniform depending upon positions on a screen.

On the other hand, there has been suggested a technology of setting the polarity of a data signal supplied to a data lines to positive and negative by 50%, by virtually (not physically) dividing a screen into an upper half and a lower half, alternately selecting a scanning line in the upper half and a scanning line in the lower half in a predetermined order, writing the data signal with one of a positive polarity and a negative polarity when the scanning line in the upper half is selected, and writing the data signal with the other of a positive polarity and a negative polarity when the scanning line in the lower half is selected (see JP-A-2004-177930).

However, in the technology, for example, after a data signal of a gray scale with a positive polarity is written to a pixel row, the data signal of the same gray scale with a negative polarity has to be written again to the pixel row. Accordingly, in the technology, since the image data supplied from the outside has to be stored in a memory and the image data supplied from the outside and the image data read out of the memory have to be alternately supplied every horizontal scanning period, there is a problem in that the configuration is complex.

SUMMARY

The present invention provides an electro-optical device capable of displaying a high-quality image with a simple configuration, a writing circuit, a driving method, and an electronic apparatus.

According to an aspect of the present invention, there is provided a writing circuit of an electro-optical device having a plurality of scanning lines, a plurality of data lines, and a plurality of pixels disposed to correspond to intersections between the plurality of scanning lines and the plurality of data lines. Here, each pixel comprises: a pixel capacitor having a pixel electrode and a common electrode opposed to the pixel electrode; and a switching element for electrically connecting the corresponding data line to the pixel electrode when the corresponding scanning line is selected. The writing circuit comprises an inversion circuit for maintaining a voltage between a potential of the data line and a predetermined potential for a predetermined time, and inverting the maintained voltage with respect to a reference potential and applying the inverted voltage to the data line after the lapse of the predetermined time, in a period of time when one scanning line of the plurality of scanning lines is selected. In the writing circuit according to an aspect of the invention, when a scanning line is selected, a data signal with a polarity is written to a pixel electrode, and then the scanning line is selected again, the voltage of the written pixel electrode is read through the corresponding data line and then the writing operation is performed again thereto with the polarity inverted. Accordingly, since a memory is not necessary, it is possible to accomplish a simple configuration.

In the invention, the plurality of data lines may be precharged to the reference potential before one scanning line of the plurality of scanning lines is selected. Specifically, the data lines may be precharged to the reference potential. Since the reading operation of reading the voltage of the pixel electrode is not affected by the voltage of the data line right before, the precision of the inverted writing operation is improved as much.

In the invention, the inversion circuit may comprise: a first transistor in which a predetermined resistance is set between the source and the drain after the lapse of the predetermined time in the period of time when one scanning line of the plurality of scanning lines is selected; a second transistor of which the gate is supplied with a voltage held by a holding element. Here, a potential difference between a predetermined high potential and a ground potential may be resistance-divided by the first and second transistors and the divided potential difference may be used as the inverted voltage.

In this configuration, the source and the drain of the first transistor may be electrically disconnected from each other for the predetermined time in the period of time when one scanning line of the plurality of scanning lines is selected. In this case, since the first transistor is turned off for the predetermined time, the current consumption due to the passing current is suppressed.

In this configuration, the holding element may hold a voltage between the source and the drain of the second transistor, may set the source of the second transistor to a predetermined potential for a predetermined time in the period of time when one scanning line of the plurality of scanning lines is selected, and may shift the source of the second transistor to the inverted voltage about the reference potential among the high potential and the ground potential after the lapse of the predetermined time in the period of time when one scanning lines of the plurality of scanning lines is selected. In this case, the source of the second transistor may be set to the reference potential for the predetermined time in the period of time when one scanning line of the plurality of scanning lines is selected, and may be then set to the ground potential after the lapse of the predetermined time. In this configuration, the threshold voltage (the minimum gate voltage with which current flows out of the drain) of the second transistor can be set low, similarly to the general transistor.

The invention may be embodied as an electro-optical device, as well as the writing circuit of an electro-optical device. In case of the electro-optical device, each pixel may comprise a pixel capacitor having a pixel electrode and a common electrode opposed to the pixel electrode. In the electro-optical device, the plurality of data lines may be divided into an upper half area and a lower half area and the scanning-line driving circuit may alternately select the scanning lines belonging to the upper half area and the scanning lines belonging to the lower half area. In this configuration, the first scanning lines belong to one of the upper half area and the lower half area and the second scanning lines belong to the other thereof.

The invention may be embodied as a method of driving the electro-optical device or an electronic apparatus having the electro-optical device, as well as the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
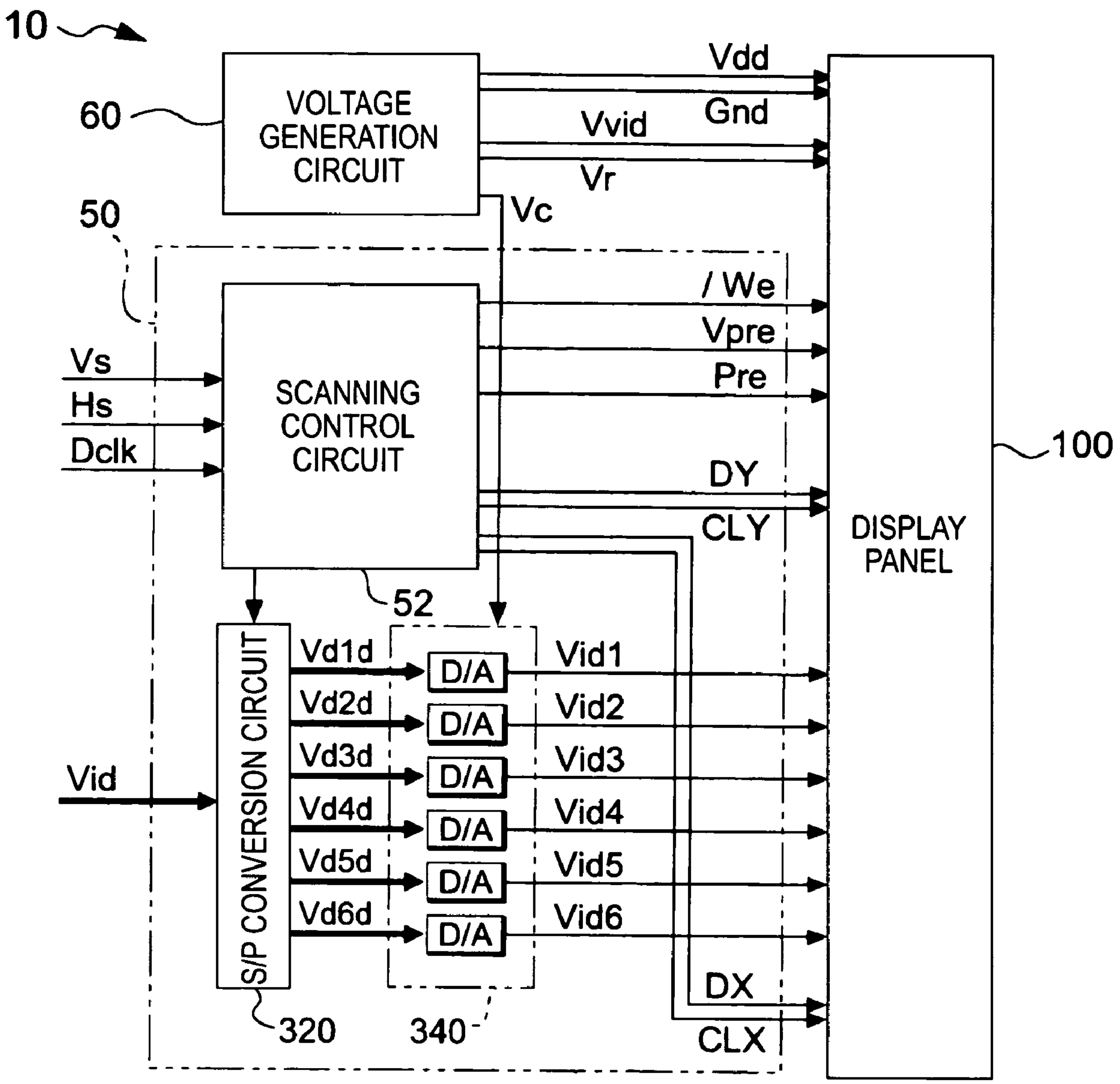
FIG. 1 is a block diagram illustrating a configuration of an electro-optical device according to an embodiment of the invention.

Hereinafter, an embodiment of the invention will be described in detail with reference to the drawings. FIG. 1 is a block diagram illustrating an entire configuration of an electro-optical device according to an embodiment of the invention.

As shown in FIG. 1, an electro-optical device 10 includes a processing circuit 50, and a voltage generating circuit 60, and a display panel 100. The processing circuit 50 and the voltage generating circuit 60 are circuit modules mounted on a printed circuit board and are connected to the display panel 100 through a flexible printed circuit (FPC) board.

The processing circuit 50 includes an S/P conversion circuit 320, a D/A conversion circuit group 340, and a scanning control circuit 52.

The S/P conversion circuit 320 distributes image data Vid supplied from an upper-level unit not shown into 6 channels in synchronization with a vertical scanning signal Vs, a horizontal scanning signal Hs, and a dot clock signal Dclk and expands the image data on the time axis by six times (also referred to as phase development or serial-parallel conversion), which are output as image data Vdi1 to Vd6*d*. Here, the image data Vid1 are digital data specifying gray scales (brightness) of pixels and are supplied at the time to be described later. For the purpose of convenient description, the image data Vd1*d* to Vd6*d* are referred to as channels 1 to 6.

The D/A conversion circuit group 340 is a group of D/A converters disposed in each channel and serves to convert the phase-developed image data Vd1*d* to Vd6*d* into analog voltages corresponding to the gray scale values with respect to a reference potential (voltage) Vc and to supply the display panel 100 with the analog voltages as the data signals Vid1 to Vid6.

In the embodiment, the image data Vid are subjected to the analog conversion after the serial-parallel conversion, but the analog conversion may be performed before the serial-parallel conversion.

Figure 8:
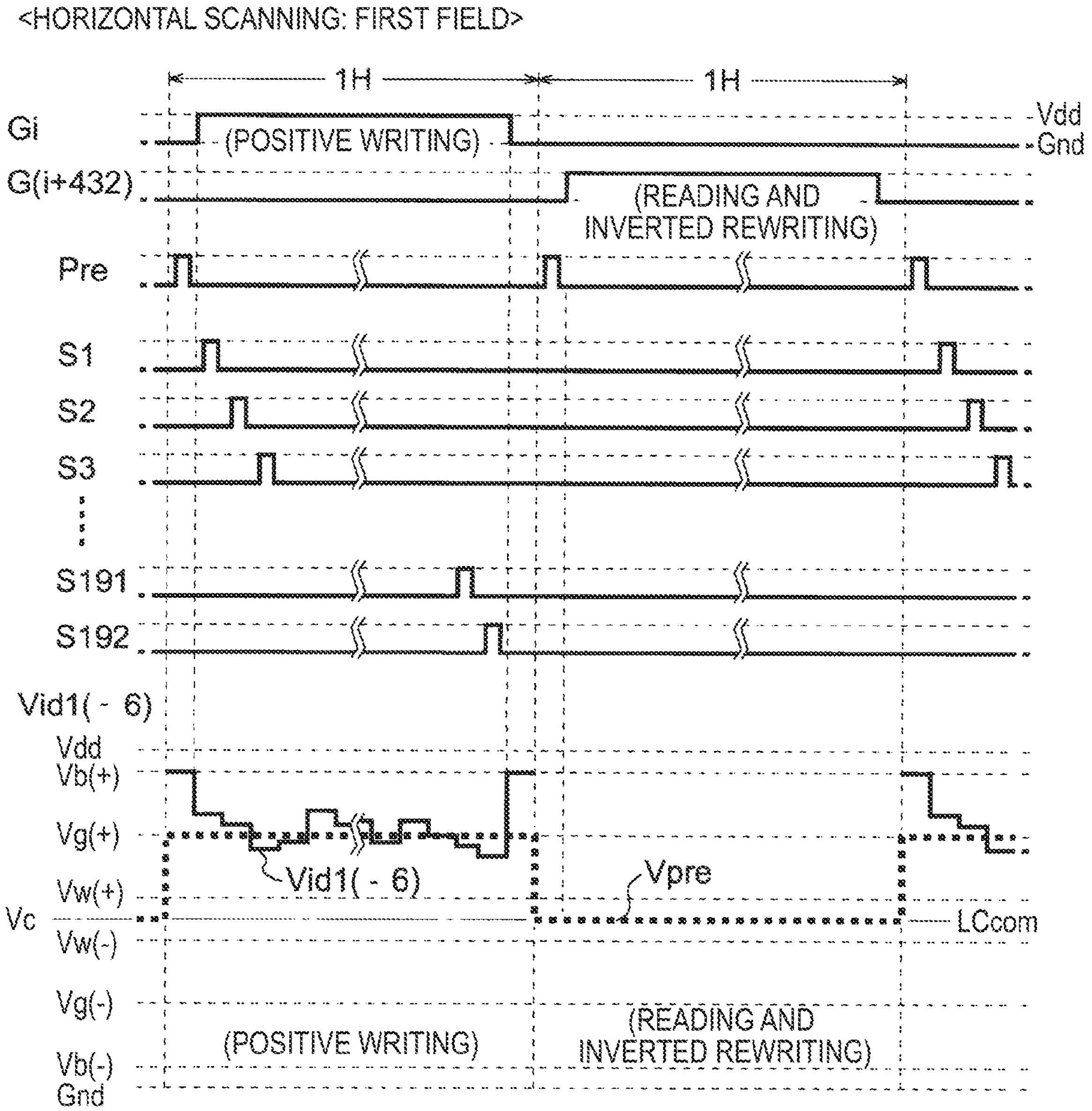
FIG. 8 is a diagram illustrating voltage waveforms of data signals in the electro-optical device.
Figure 9:
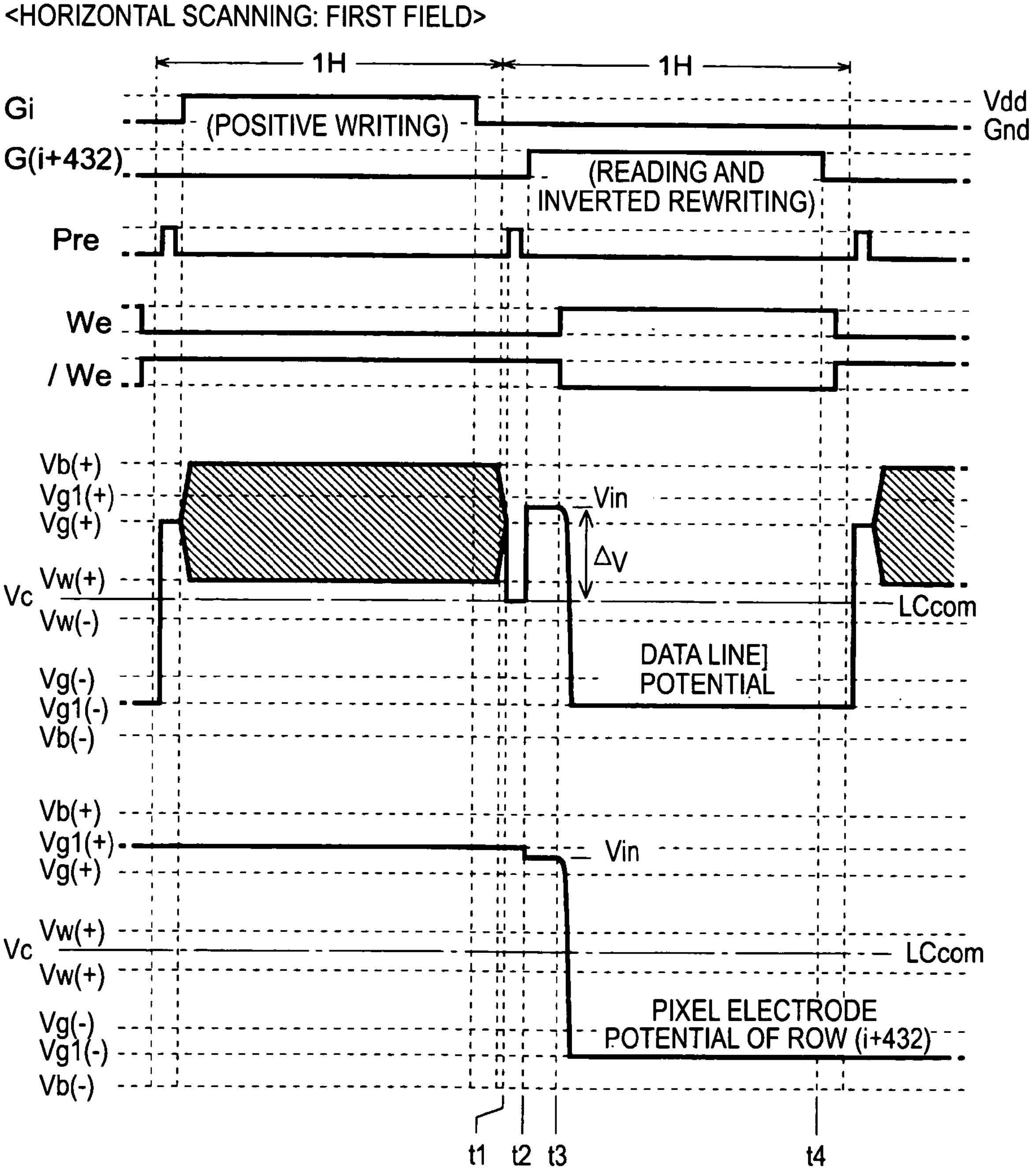
FIG. 9 is a diagram illustrating a reading and inverted rewriting operation in the electro-optical device.

Here, the voltage Vc is a potential corresponding to the center amplitude of the data signal, as shown in FIGS. 8 and 9 to be mentioned later. The voltage Vc is an approximately center value between the high voltage Vdd and the ground potential Gnd of a power source and is a reference for the writing polarity to the pixels. That is, in the embodiment, a potential higher than the voltage Vc is referred to as positive and a potential lower than the voltage is referred to as negative. As for a voltage, the ground potential Gnd of the power source is used as a reference as long as particular description does not exist.

The scanning control circuit 52 has a first function of controlling the scanning of the display panel 100, a second function of controlling the phase development of the S/P conversion circuit 320 in synchronization with the horizontal scanning of the display panel 100, and a third function of controlling an operation of the writing circuit 182 which is a feature of the invention (to be described later) by outputting a read enable signal /We.

The first function is described in detail. The scanning control circuit 52 serves to output a control signal Pre and a precharge signal Vpre to control a precharge time and a precharge voltage in the display panel 100, as well as to generate a transmission start pulse DX and a clock signal CLX from the dot clock signal Dclk, the vertical scanning signal Vs, and the horizontal scanning signal Hs supplied from the upper-level unit to control the horizontal scanning of the display panel 100 and to generate a transmission start pulse DDY and a clock signal CLY to control the vertical scanning of the display panel 100.

The voltage generating circuit 60 supplies an adjustment voltage Vvid and a reference voltage Vr to the display panel 100, in addition to the source voltage Vdd. Although not shown, the voltage generating circuit also generates a voltage LCcom applied to a common electrode to be described later.

Figure 2:
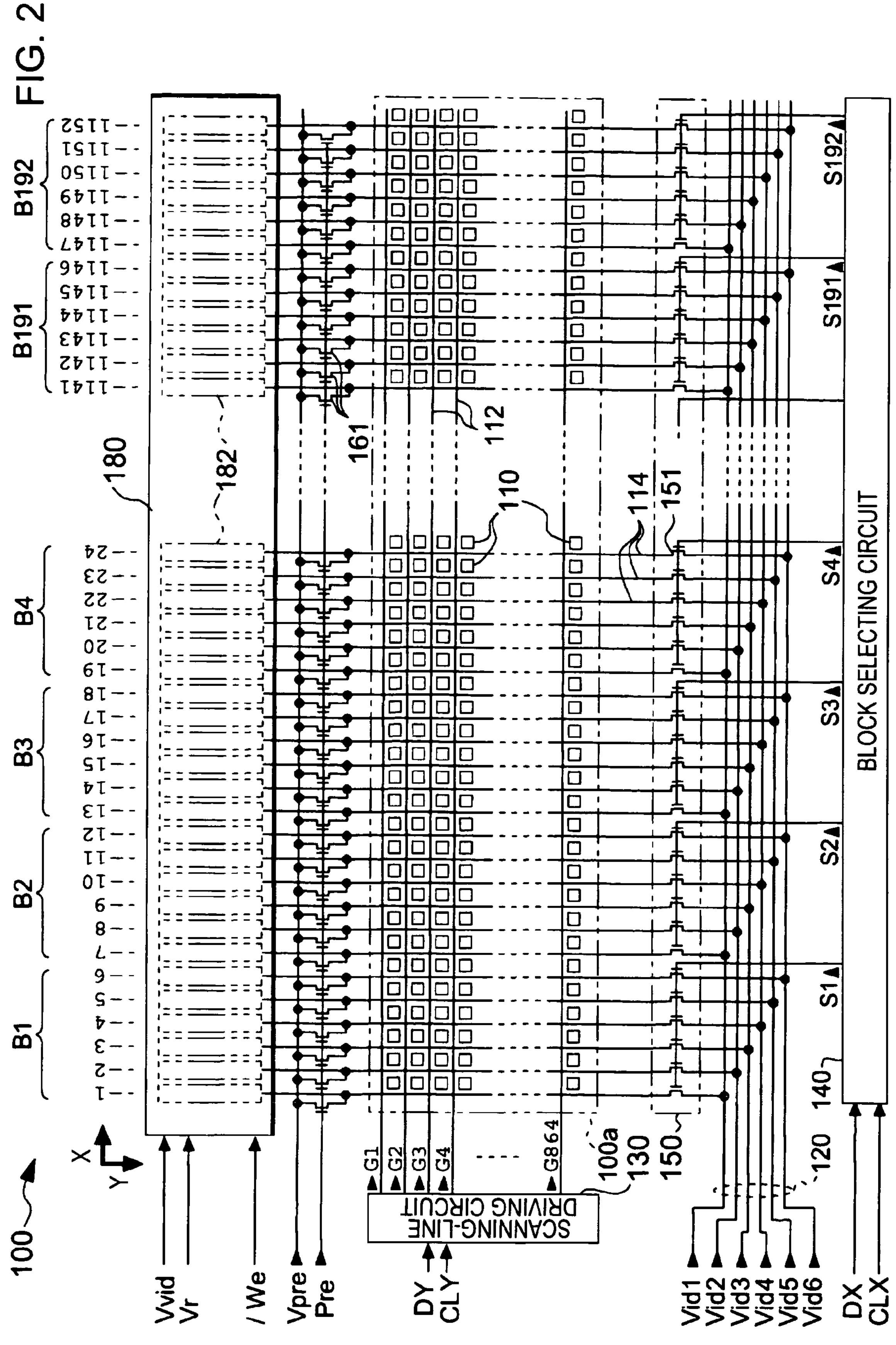
FIG. 2 is a diagram illustrating a configuration of a display panel in the electro-optical device.
Figure 3:
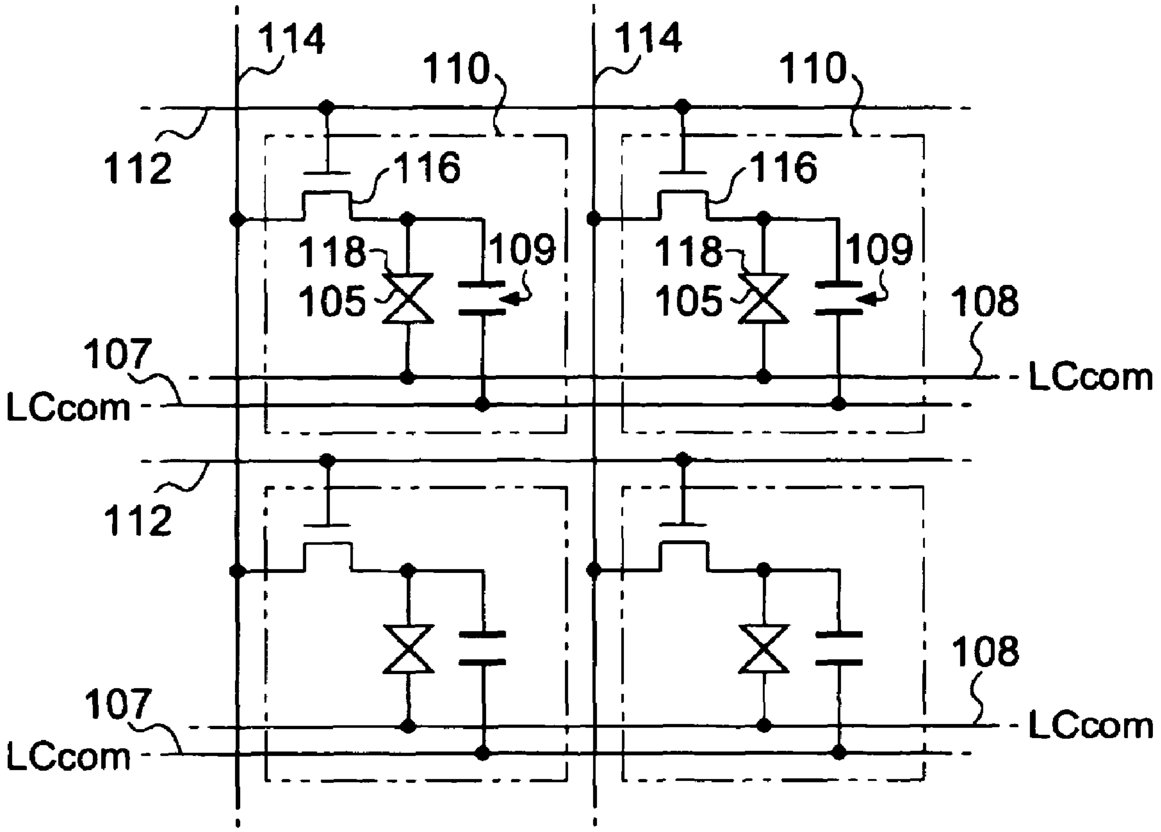
FIG. 3 is a diagram illustrating a configuration of a pixel in the display panel.
Figure 4:
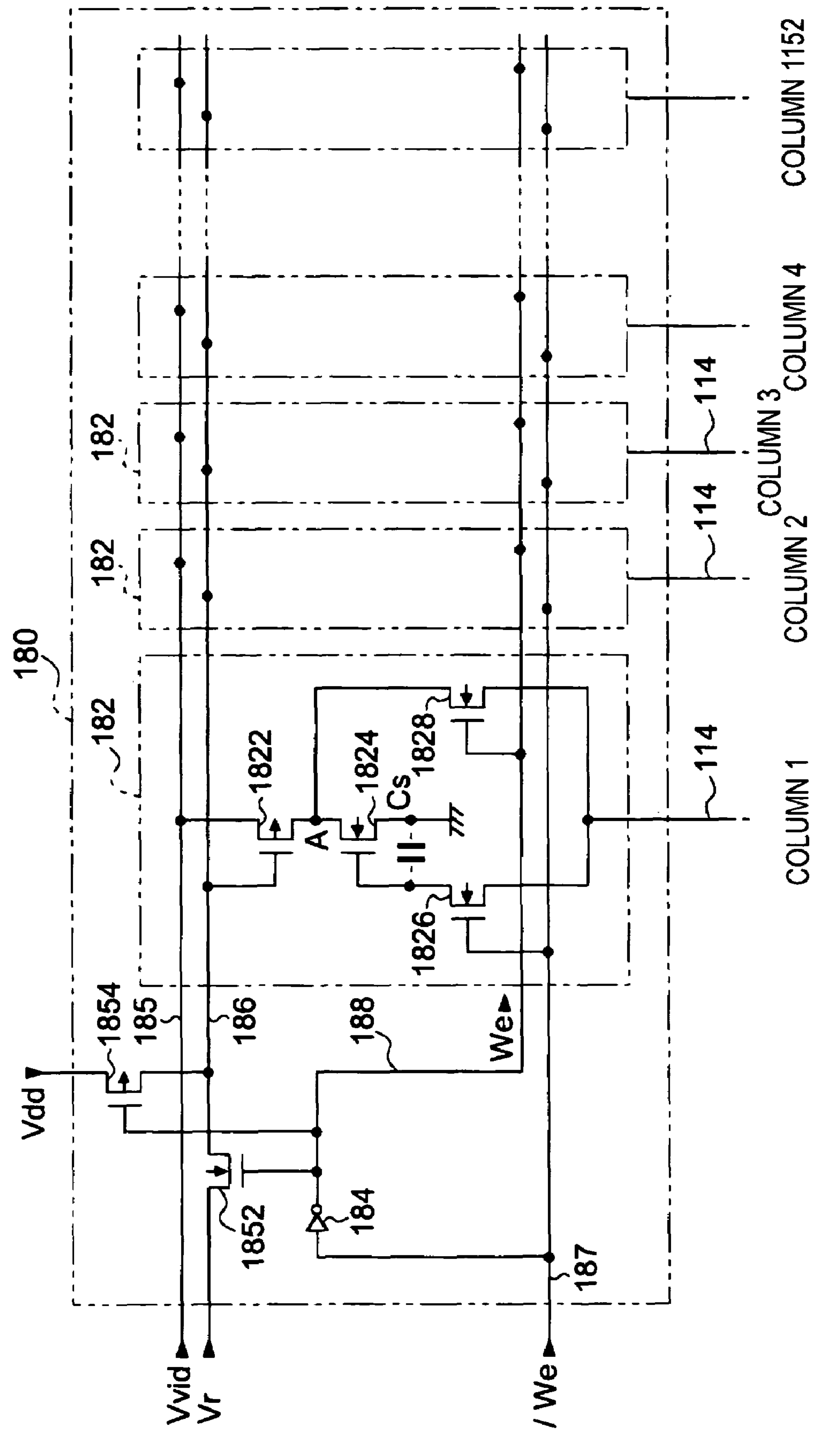
FIG. 4 is a diagram illustrating a configuration of a writing circuit group in the electro-optical device.

Next, a configuration of the display panel 100 will be described. The display panel 100 serves to form a predetermined image by the use of electro-optical variation. FIG. 2 is a block diagram illustrating an electrical configuration of the display panel 100, FIG. 3 is a diagram illustrating a detailed configuration of a pixel in the display panel 100, and FIG. 4 is a diagram illustrating a configuration of a writing circuit group in the display panel 100.

The display panel 100 has a configuration that an element substrate and a counter substrate on which the common electrode is formed are bonded to each other with a constant gap therebetween by the use of a seal member and liquid crystal is injected into the gap.

As shown in FIG. 2, 864 scanning lines 112 extend in the X (horizontal) direction in the figure and 1152 (=192×6) data lines 114 extend in the Y (vertical) direction. The pixels 110 are disposed to correspond to the intersections between the scanning lines 112 and the data lines 114, respectively. Therefore, the pixels 110 are arranged in a matrix shape of 864 rows×1152 columns in a display area 100*a*, but the invention is not limited to it.

In the embodiment, the 1152 data lines 114 are blocked in a unit of six columns. Accordingly, for the purpose of convenient description, the first, second, third, . . . , and 192-th blocks from the left are denoted by B1, B2, B3, . . . , and B192, respectively.

In the detailed configuration of the pixels 110, as shown in FIG. 3, the source of an n-channel TFT (Thin Film Transistor) 116 is connected to the corresponding data line 114, the drain thereof is connected to the corresponding pixel electrode 118, and the gate is connected to the corresponding scanning line 112.

A common electrode 108 is disposed in all the pixels so as to be opposed to the pixel electrode 118 formed on the element substrate. The liquid crystal 105 is inserted and maintained between the pixel electrodes 118 and the common electrode 108. Accordingly, the pixel electrode 118, the common electrode 108, and the liquid crystal 105 constitute a pixel capacitor every pixel.

A voltage LCcom which is temporally constant is applied to the common electrode 108 and in this embodiment, the voltage (potential) is equal to the reference voltage Vc. However, the voltage may be set slightly lower than the reference voltage Vc for the reason to be described later.

Although particularly not shown, the opposed surfaces of both substrates are provided with an alignment film rubbed so that the major axis direction of liquid crystal molecules is continuously twisted, for example, by about 90 degrees and the back surfaces of both substrates are provided with a polarizer according to the alignment directions.

Light passing between the pixel electrode 118 and the common electrode 108 optically rotates by about 90 degrees with the twist of the liquid crystal molecules when the effective voltage value applied to the pixel capacitor is zero. With increase in effective voltage value, the liquid crystal molecules are tilted in the electric field direction, so the optical rotation is lost. Accordingly, for example, in a transmissive type in which the polarizing films of which the polarization axes are perpendicular to each other are disposed according to the alignment directions, when the effective voltage value is close to zero, the transmissivity of light becomes the maximum value, thereby displaying white. On the contrary, with increase in effective voltage value, the amount of light passing therethrough is reduced and the transmissivity of light becomes the minimum, thereby displaying black (normally white mode).

In order to reduce the influence of charge leakage from the pixel capacitor through the TFT 116 at the time of turning off the TFT, a storage capacitor 109 is formed every pixel. An end of the storage capacitor 109 is connected to the pixel electrode 118 (the drain of the TFT 116) and the other end thereof is connected to the capacitor line 107 in common to all the pixels. The capacitor lines 107 are not shown in FIG. 2, but are held with the same voltage LCcom as the common electrode 108 in this embodiment. Specifically, the capacitor lines 107 are formed on the element substrate and the common electrode 108 is formed on the counter substrate. The capacitor lines 107 and the common electrode 108 are electrically connected to each other through a conductive material not shown. Accordingly, the pixel capacitor and the storage capacitor are added in parallel to the pixel electrode 118 (the drain of the TFT 116) and the common electrode 108 every pixel 110.

The TFTs 116 of the pixels 110 are formed through the manufacturing process common to a scanning-line driving circuit 130, a block selecting circuit 140, a sampling switch 151 to be described later, thereby contributing to decrease in size and cost of the whole device.

Peripheral circuits such as the scanning-line driving circuit 130 and the block selecting circuit 140 are disposed around the display area 100*a* in which the pixels 110 are arranged.

The scanning-line driving circuit 130 serves to supply the scanning signals G1, G2, G3, . . . , G864 to the scanning lines 112 of row 1, row 2, row 3, . . . , row 864. Specifically, as shown in FIG. 5, the scanning-line driving circuit 130 divides a vertical scanning period (frame) into a first field and a second field, selects the scanning lines 112 in the order of row 1, row 433, row 2, row 434, row 3, row 435, . . . , row 432, and row 864 every horizontal scanning period (1H), and changes the scanning signal of the selected scanning line 112 to the H level.

That is, the scanning-line driving circuit 130 divides the display area 100*a* into an upper half area of rows 1 to 432 and a lower half area of rows 433 to 864, alternately selects the upper half area and the lower half area in each field, sequentially selects the scanning lines 112 from the upside to the downside in the selected half area, and changes the scanning signal of the selected scanning line 112 to the H level.

The details of the scanning-line driving circuit 130 are omitted because it does not relate directly to the invention, and is constructed so as to sequentially shift the transmission start pulse DY being supplied at the first time of each field and having a pulse width (H level) corresponding to a half cycle of the clock signal CLY whenever the level of the clock signal CLY is changed (rises or drops) and to narrow the pulse width to output the scanning signals G1, G433, G2, G434, G3, G435, . . . , G432, and G864.

Figure 5:
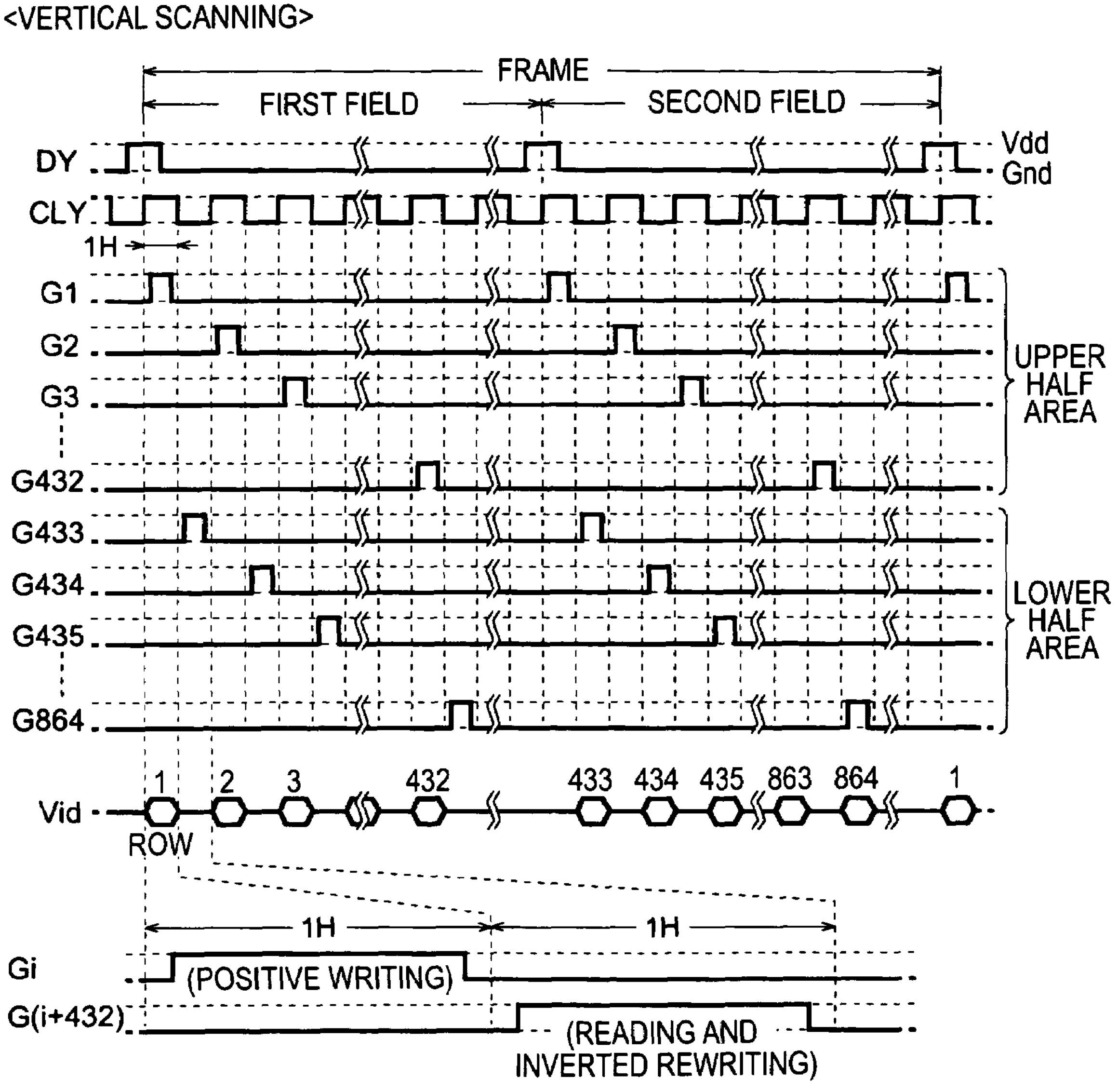
FIG. 5 is a diagram illustrating a vertical scanning operation in the electro-optical device.

Here, when an integer greater than or equal to 1 and less than or equal to 432 is denoted by i for the purpose of generally describing the scanning lines 112 belonging to the upper half area without specifying a row, the scanning signal Gi supplied to the scanning line 112 of row i belonging to the upper half area and the scanning signal G(i+432) supplied to the scanning line 112 of row (i+432) which belongs to the lower half area and which is apart by 432 rows from the scanning line 112 of row i are sequentially changed to the H level in the adjacent horizontal scanning period, as shown in FIG. 5.

As described above, since the pulse width having the H level in each scanning signal is narrowed smaller than the pulse width of the clock signal CLY, the period of time is guaranteed in the scanning signals Gi and G(i+432) output temporally adjacent to each other.

As shown in FIG. 5, the image data Vid corresponding to the pixels in columns 1 to 1152 in the rows of the selected scanning lines 112 are sequentially supplied in the horizontal scanning period in which the scanning line 112 in the upper half area is selected in the first field. On the other hand, the image data corresponding to the pixels in columns 1 to 1152 in the rows of the selected scanning lines 112 are sequentially supplied in the horizontal scanning period in which the scanning line 112 in the lower half area is selected in the second field.

Figure 6:
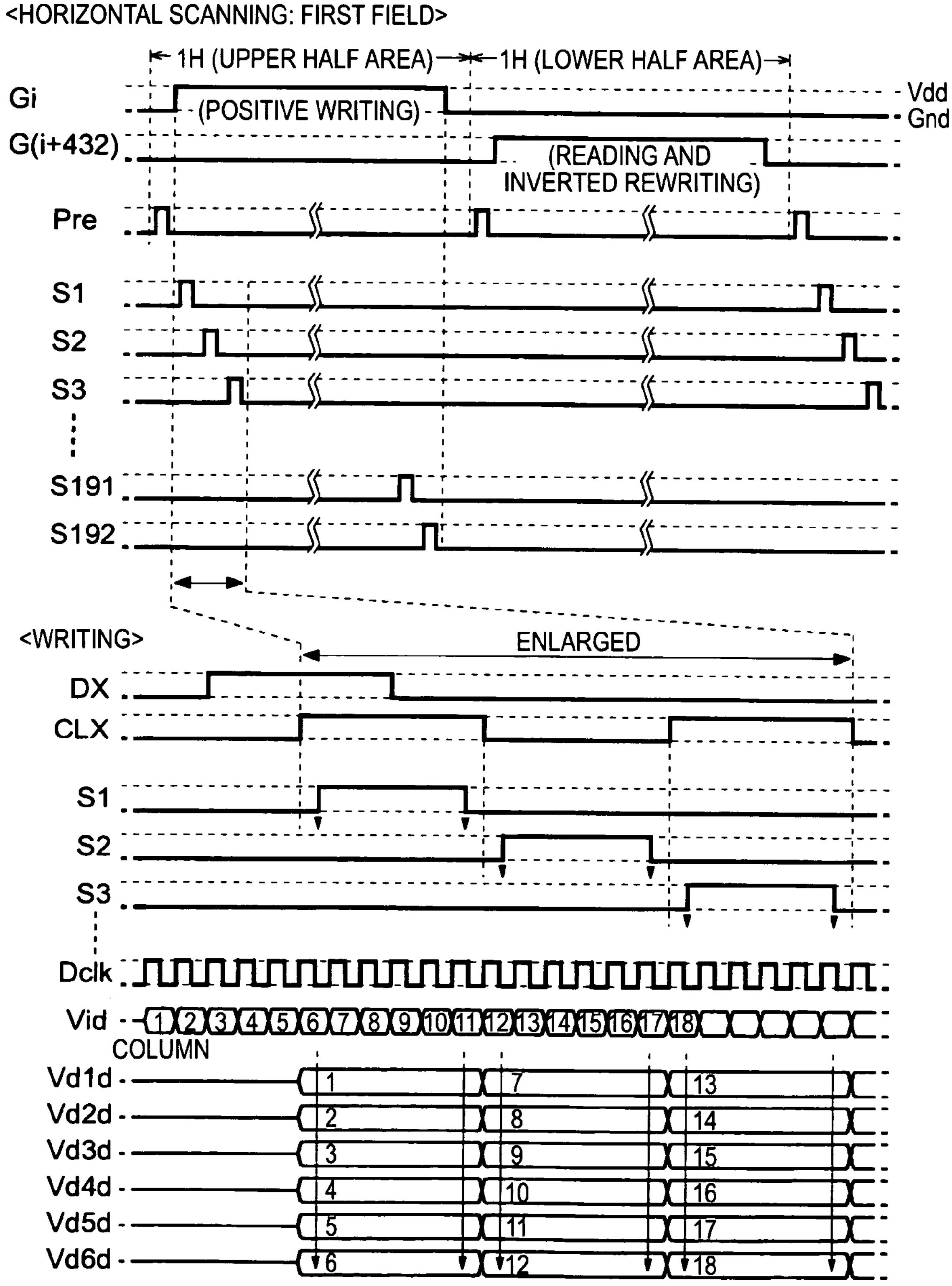
FIG. 6 is a diagram illustrating a horizontal scanning operation of a first field in the electro-optical device.

Next, as shown in FIG. 6, in the horizontal scanning period in which the scanning line 112 in the upper half area is selected in the first field, the block selecting circuit 140 sequentially shifts the transmission start pulse DX being supplied at the first time of the horizontal scanning period and having a pulse width (H level) corresponding to a cycle of the clock signal CLX whenever the level of the clock signal CLX is changed (rises or drops) and narrows the pulse width to output the sampling signals S1, S2, S3, G435, . . . , and S192, thereby horizontally scanning the display panel 100. On the contrary, in the horizontal scanning period in which the scanning line 112 in the lower half area is selected in the first field, the block selecting circuit maintains the sampling signals S1, S2, S3, . . . , and S192 at the L level without performing the shift operation.

Figure 7:
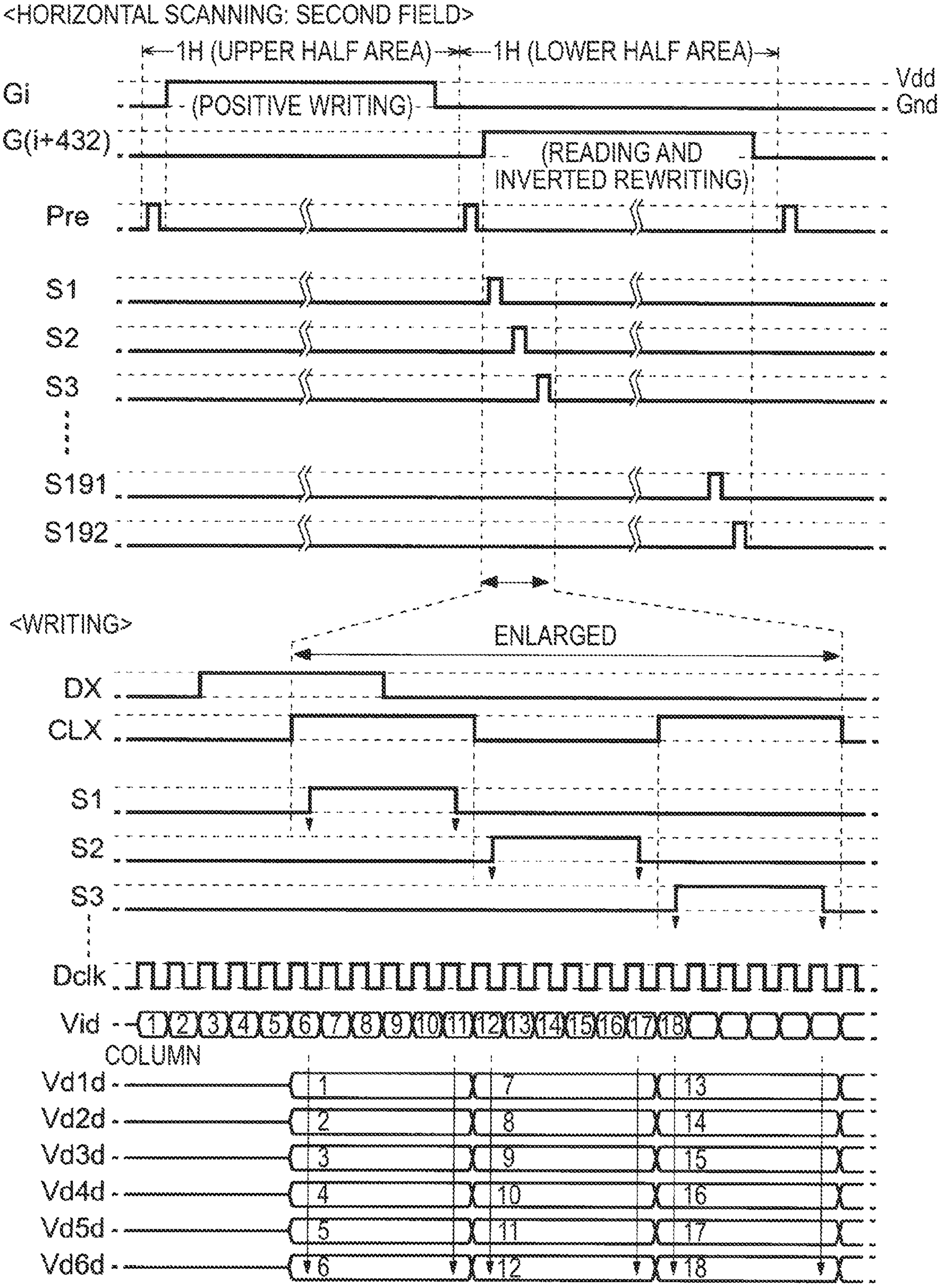
FIG. 7 is a diagram illustrating a horizontal scanning operation of a second field in the electro-optical device.

As shown in FIG. 7, in the horizontal scanning period in which the scanning line 112 in the upper half area is selected in the second field, the block selecting circuit 140 maintains the sampling signals S1, S2, S3, . . . , and S192 at the L level without performing the shift operation. On the contrary, in the horizontal scanning period (1H) in which the scanning line 112 in the lower half area is selected, the block selecting circuit sequentially changes and outputs the sampling signals S1, S2, S3, G435, . . . , and S192 to the H level.

Therefore, in this embodiment, the writing operation to the pixels in response to the supply of the data signals Vid1 to Vid6 is not performed to the lower half area in the first field and the upper half area in the second field. On the contrary, the lower half area in the first field and the upper half area in the second field are subjected to the reading and rewriting operation of reading and holding the voltages written to the pixel electrodes through the data lines 114, inverting the held voltages with respect to the voltage Vc, and writing the inverted voltages to the pixels, when the scanning line is selected.

The sampling circuit 150 is a set of the sampling switches 151 disposed to correspond to the data lines 114. The respective sampling switches 151 are, for example, an n-channel TFT and the drain thereof is connected to the corresponding data line 114.

Here, the gates of the six sampling switches corresponding to the data lines 114 belonging to the same block are supplied in common with a sampling signal corresponding to the block. For example, the gates of the six sampling switches 151 corresponding to the data lines 114 in rows 19 to 24 belonging to the block B4 are supplied in common with the sampling signal S4 corresponding to the block B4.

The sources of the sampling switches 151 are connected to one of six image signal lines 120 supplied with the data signals Vid1 to Vid6 for the following reason.

That is, in the sampling switch 151 of which the drain is connected to an end of the data line 114 of column j from the left in FIG. 2, the source is connected to the image signal line 120 supplied with the data signal Vid1 when the remainder obtained by dividing j by 6 is "1." Similarly, in the sampling switches 151 of which the drain is connected to the data lines 114 in which the remainder obtained by dividing j by 6 is "2", "3", "4", "5", and "0", the source thereof is connected to the image signal lines 120 supplied with the data signals Vid2 to Vid6, respectively. For example, the source of the sampling switch 151 of which the drain is connected to the data line 114 of column 23 in FIG. 2 is connected to the image signal line 120 supplied with the data signal Vid5, since the remainder obtained by dividing "23" by 6 is "5."

Here, j is a symbol for indicating the column of the data lines 114 and is an integer greater than or equal to 1 and less than or equal to 1152 in this embodiment.

When a sampling signal is changed to the H level, the six sampling switches 151 of the block corresponding to the sampling signal are turned on and the data signals Vid1 to Vid6 supplied to the image signal lines 120 are sampled to the six data lines 114 belonging to the block.

The precharge switches 161 are an n-channel TFT disposed to correspond to the data lines 114. The drain of the precharge switch 161 of each column is connected to the corresponding data line 114, the source is connected in common to the signal line supplied with the precharge signal Vpre, and the gate is connected in common to the signal line supplied with a control signal Pre.

Here, as shown in FIGS. 6 and 7, the control signal Pre is a pulse with the H level output in the period in which all then scanning signals are changed to the L level and right before the corresponding scanning signal is changed to the H level in each horizontal scanning period (1H) of each filed.

As shown in FIG. 8, in the first field, the precharge signal Vpre has the voltage Vg(+) in the horizontal scanning period (1H) in which the scanning line in the upper half area is selected and has the voltage Vc in the horizontal scanning period (1H) in which the scanning line in the lower half area is selected. In the second field, the precharge signal Vpre is opposite to that of the first field. That is, in the second field, the precharge signal Vpre has the voltage Vc in the horizontal scanning period (1H) in which the scanning line in the upper half area is selected and has the voltage Vg(+) in the horizontal scanning period (1H) in which the scanning line in the lower half area is selected.

In the voltages shown in FIG. 8, the voltages Vb(+), Vw(+), and Vg(+) are positive voltages for setting a pixel of a pixel electrode 118 supplied with the voltages to black with the lowest gray scale, white with the highest gray scale, and gray which is an intermediate gray scale between black and white, respectively, and the voltage ranges thereof belong to the range between the voltage Vc and the source voltage Vdd.

The voltages Vb(−), Vw(−), and Vg(−) are negative voltages for setting a pixel of a pixel electrode 118 supplied with the voltages to black, white, and gray, respectively, and form symmetry about the reference voltage Vc with the voltages Vb(+), Vw(+), and Vg(+), respectively. However, in this embodiment, the negative data signals Vid1 to Vid 6 are not supplied.

In FIG. 8, the vertical voltage axis in the voltage waveforms of the data signals Vid1 to Vid6 is enlarged in comparison with the voltage axis of the logic signals such as the scanning signals Gi and the sampling signals S1, S2, . . . (which is true of FIG. 9 to be described later).

The writing circuit group 180 includes the writing circuit 812 and various elements disposed in the respective data lines 114. FIG. 4 is a diagram illustrating a detailed configuration o the writing circuit group 180.

As shown in the figure, a read enable signal /We is input to the writing circuit group 180 from the scanning control circuit 52 through the signal lines 187. Here, "/" means inversion. That is, the read enable signal /We indicates the opposite concept of a write enable signal We.

The read enable signal /We is logically inverted by a NOT circuit 184 and is output as the write enable signal We to the signal lines 188. The writing circuit group 180 is supplied with an adjustment voltage Vvid through the power supply line 185 from the voltage generating circuit 60 and a reference voltage Vr is input to an input terminal thereof.

The source of an n-channel transistor 1852 is connected to the input terminals of the reference voltage Vr, the drain thereof is connected to the power supply line 186, and the gate thereof is connected to the signal line 188.

The source of a p-channel transistor 1854 is connected to the power supply line of the source voltage Vdd, the drain thereof is connected to the signal line 186, and the gate thereof is connected to the signal line 188.

The writing circuit 182 is provided in each data line 114 and has the same configuration in each column. Accordingly, the configuration of the writing circuits 182 will be described representatively for column 1 as shown in FIG. 4.

As shown in FIG. 4, the writing circuit 182 has a p-channel transistor (first transistor) 1822 and n-channel transistors (second transistors) 1824, 1826, and 1828.

The source, the drain, and the gate of the transistor 1826 are connected to the data line 114 of the corresponding column (here, column 1), the gate of the transistor 1824, and the signal line 187, respectively. On the other hand, the source, the drain, and the gate of the transistor 1828 are connected to the common drain of the transistors 1822 and 1824, the data line 114 of the corresponding column, and the signal line 188, respectively.

The source of the transistor 1822 is connected to the power supply line 185 and the gate thereof is connected to the power supply line 186. On the other hand, the source of the transistor 1824 is connected to the ground potential Gnd and the gate thereof si connected to the drain of the transistor 1826. The drains of the transistors 1822 and 1824 are connected to the source of the transistor 1828 as a node A.

Here, the transistors 1822 and 1824 are designed to operate in an unsaturated region when the reference voltage Vr is applied to the gate of the transistor 1822. The transistor 1824 is designed to operate in a saturated domain when a voltage greater than or equal to Vc(+) and less than or equal to Vc(+)+ΔVmax is applied to the gate and to change the voltage of the node A to the voltage Vc when the gate of the transistor 1824 has the voltage Vc and the reference voltage Vr is applied to the gate of the transistor 1822.

A parasitic capacitor Cs is formed between the gate and the drain of the transistor 1824 as indicated by the dotted line in the figure so as to maintain the voltage between the gate and the drain. In this embodiment, the parasitic capacitor Cs is used as a voltage holding element, but a capacitor or a voltage holding circuit may be provided actively.

Operations of the electro-optical device will be described.

First, the entire operations are schematically described. As shown in FIG. 5, the scanning lines 112 are selected in the order of row 1, row 433, row 2, row 434, row 3, row 435, . . . , row 432, and row 864 every horizontal scanning period (1H) in both of the first and second fields, and the scanning signal to the selected scanning line is changed to the H level. In the first field, the positive writing in response to the supply of the data signals Vid1 to Vid6 is performed when the scanning line 112 in the upper half area (rows 1 to 432) is selected, but an operation (reading and inverted rewriting operation) of reading and holding the voltages of the pixel electrodes 118 and writing the inverted (amplified) voltages of the held voltages, instead of performing the writing operation in response to the supply of the data signals, when the scanning line 112 in the lower half area (rows 433 to 864) is selected. In the subsequent second field, the reading and inverted writing operation is performed when the scanning line 112 in the upper half area is selected and the positive writing operation in response to the supply of the data signals is performed when the scanning line 112 in the lower half area is selected.

In this embodiment, since the positive voltages of the pixel electrodes 118 written previously are read and the read voltages are inverted and written again as a negative voltage to the pixel electrodes, the alternating drive of the pixel capacitors is embodied even when the data signals are supplied repeatedly.

Next, details of the operations will be described.

First, in the period in which the scanning line 112 of row 1 is first selected in the first field, the positive writing operation in response to the supply of the data signals Vid1 to Vid6 is performed to the pixels 110 of row 1.

Here, in FIGS. 6, 8, and 9, i=1 is set.

The precharge signal Vpre is changed to the H level before the scanning signal G1 is changed to the H level. For this reason, the source and the drain of all the precharge switches 161 are electrically connected to each other (turned on). On the other hand, in the horizontal scanning period (1H) in which the scanning line of the upper half area is selected in the first field, the precharge signal Vpre is set to the voltage Vg(+), so the data lines 114 of column 1 to 1152 are precharged to the voltage Vg(+).

When the scanning signal G1 is changed to the H level after the precharging operation, all the TFTs 116 of which the gate is connected to the scanning line 112 of row 1 are turned on.

In the horizontal scanning period in which the scanning line 112 of row 1 is selected in the first filed, as shown in FIG. 6, the image data Vid of the pixels in row 1 and column 1 to row 1 and column 1152 are supplied from the upper-level unit in synchronization with the dot clock Dclk. First, the image data Vid are first divided into the 6 channels by the S/P conversion circuit 320 and expanded on the time axis by six times. Second, the image data Vid are converted into the data signals vid1 to Vid6 with a positive analog voltage by the D/A conversion circuit group 340 and are supplied to the image signal lines 120. The voltages of the data signals Vid1 to Vid6 are higher than the voltage Vc, as the gray scales specified by the image data Vid become darker.

The transmission start pulse DX and the clock signal CLX are supplied in synchronization with the dot clocks Dclk to control the horizontal scanning operation by the block selecting circuit 140. That is, the sampling signals S1, S2, S3, . . . , and S192 are output in synchronization with the phase developing operation.

When the sampling signal S1 is changed to the H level in a state that all the TFTs 116 of which the gate is connected to the scanning line 112 of row 1 are turned on, the data signals Vid1 to Vid6 are sampled to the data lines 114 of columns 1 to 6 belonging to the block B1, respectively. Accordingly, the sampled data signals Vid1 to Vid6 are applied to the pixel electrodes 118 of the pixels corresponding to the intersections between the scanning line 112 of row 1 from the upside in FIG. 2 and the six data lines 114 (columns 1 to 6 from the left).

Thereafter, when the signal S2 is changed to the H level, the data signals Vid1 to Vid6 are sampled to the data lines 114 of columns 7 to 12 belonging to the block B2. The data signals Vid1 to Vid6 are applied to the pixel electrode 118 of the pixels corresponding to the intersections between the scanning line 112 of row 1 and the data lines 114 of columns 7 to 12, respectively.

In this way, when the samplings signals S3, S4, . . . , and S192 are sequentially and exclusively changed to the H level, the data signals Vid1 to Vid6 are sampled to the six data lines 114 belonging to the blocks B3, B4, . . . , B192, respectively. The data signals Vid1 to Vid6 are applied to the pixel electrodes 118 of the pixels corresponding to the intersections between the scanning line 112 of row 1 and the six data lines 114, respectively. Accordingly, the writing operation to all the pixels of row 1 is finished.

Even when the scanning signals G1 are changed to the L level and the TFTs 116 are turned off, the positive voltage written to the pixel electrodes 118 are held in the pixel capacitors or the storage capacitors 109 until the scanning signal G1 is changed again to the H level.

In the horizontal scanning period (1H) in which the scanning line 112 in the upper half area is selected in the first field, as shown in FIG. 9, the read enable signal /We is fixed to the H level and thus the write enable signal We which is an inverted signal thereof is fixed to the L level. Accordingly, in FIG. 4, since the transistors 1852 and 1854 are turned off and on, respectively, the power supply line 186 is changed to the voltage Vdd corresponding to the H level, thereby turning off the transistor 1822. since the read enable signal /We and the write enable signal We are in the H and L levels, respectively, the transistors 1826 and 1828 are turned on and off, respectively.

Therefore, in the horizontal scanning period (1H) in which the scanning line 112 in the upper half area is selected in the first field, the writing circuit 182 of each column does not perform the operation of changing the voltage o the corresponding data line 114.

In the horizontal scanning period (1H), the data line 114 of column j is generally precharged to the voltage Vg(+) of the precharge signal Vpre and then holds the voltage Vg(+) with the parasitic capacitor of the data line 114, when the control signal Pre is changed to the H level, and is changed to the voltage of the sampled image data when the corresponding sampling switch 151 is turned on. When the sampling switch 151 is turned off, the sampling switch 151, the precharge switch 161, and the transistor 1828 are all turned off until the selection of the scanning lines 112 is finished. Accordingly, the data line 114 holds the voltage of the sampled image data with the parasitic capacitor (including the capacitor Cs).

In the horizontal scanning period (1H) in which the scanning line 112 of row i belonging to the upper half area is selected in the first field, the variation in potential of the data line to which the data signal is sampled in a relatively early stage is shown in FIG. 9. The hatched region in FIG. 9 indicates a voltage is specified in the corresponding range in accordance with the gray scale value specified by the image data Vid.

Subsequently, in the first field, the scanning line of row 433 belonging to the lower half area is selected next to the scanning line 112 of row 1 and the reading and inverted rewriting operation is performed to the pixels in row 433. Here, since i=1, G(i+432) in FIGS. 6 and 9 is G433.

First as shown in FIG. 9, the precharge signal Vpre is changed to the H level at the time t1. Accordingly, the source and the drain of all the precharge switches 161 are electrically connected to each other (turned on).

On the other hand, as described above, in the horizontal scanning period (1H) in which the scanning line in the lower half area is selected in the first field, the precharge signal Vpre is changed to the voltage Vc, so the data lines 114 of columns 1 to 1152 are precharged to the voltage Vc. Accordingly, as shown in FIG. 9, the potentials of the data lines are changed to the voltage Vc from the data signal voltage (which is in the range of Vw(+) to Vb(+)) sampled when the scanning line of row 1 is selected at the time $t_1$.

Next, at the time $t_2$ when the scanning signal G433 is changed to the H level, since the read enable signal /We and the write enable signal We are maintained in the H and L levels, respectively, the transistors 1826 and 1828 in the writing circuit 182 of each column are turned on and off, respectively.

Therefore, in this state, when the TFT 116 of which the gate is connected to the scanning line 112 of row 433 is turned on, the data lines 114 of columns 1 to 1152 are changed from the precharge voltage Vs by ΔV corresponding to the positive voltage written previously to the pixel electrodes 118 in row 433 and column 1 to row 433 and column 1152.

Figure 10A:
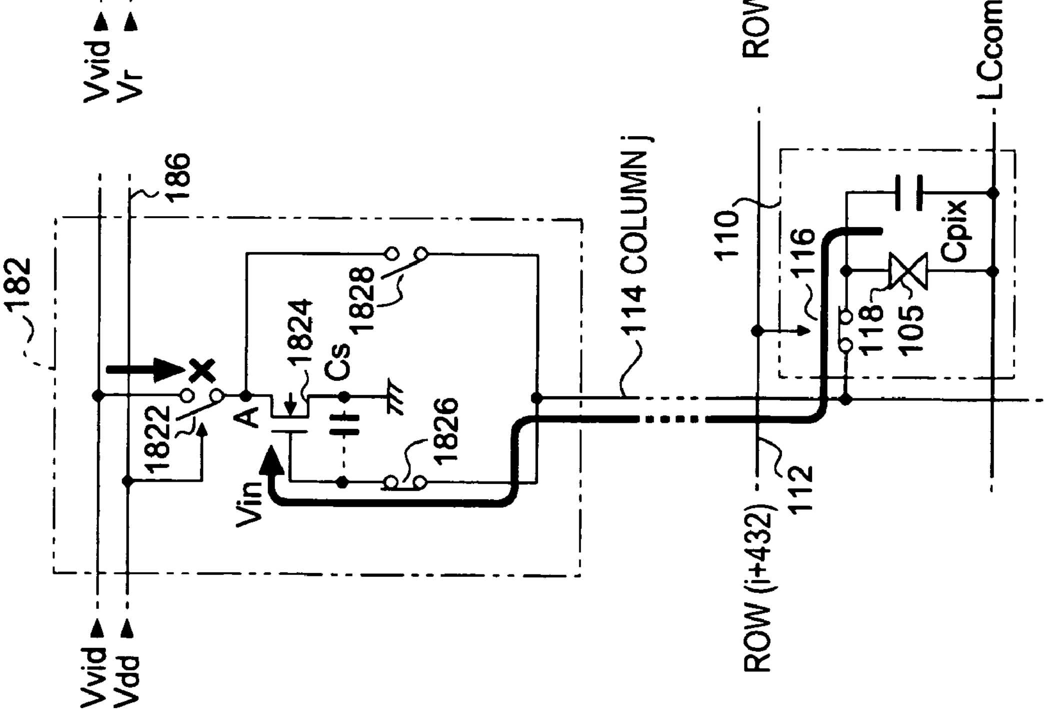
FIGS. 10A to 10C are diagrams illustrating operations of a writing circuit in each column in the electro-optical device.

Column j is representatively described. As shown in FIG. 10A, since the TFT 116 and the transistor 1826 are turned on, the pixel electrode 118, the data line 114, and the gate of the transistor 1824 are changed to the same potential when the threshold characteristic of the transistors are neglected. Here, when the positive voltage written previously to the pixel electrode 118 in row 433 and column j is changed to Vg1(+), the voltage Vin of the pixel electrode 118, the data line 114, and the gate of the transistor 1824 can be expressed by the following expression:

$$
\begin{aligned}
Vin &= Vc + \Delta V; \\
&= Vc + Vg1(+)\cdot Cpix/(Cpix + Cs + Cg).
\end{aligned}
$$

In the expression, Cpix denotes the sum of the capacitance of the pixel capacitor and the capacitance of the storage capacitor and Cs denotes the parasitic capacitance between the gate and the drain of the transistor 1824 as described above. Cg denotes a parasitic capacitance generated by the intersections between the data line 114 of column j and the scanning lines 112 of rows 1 to 864.

Accordingly, in the first field, the voltage appearing right after the scanning signal of the scanning line 112 belonging to the lower half area is changed to the H level is expressed as being increased from the precharge voltage Vc by the voltage variation ΔV when the parasitic capacitances Cs and Cg are added to the charge accumulated previously in the pixel capacitor (and the storage capacitor) Cpix and then re-distributed.

The pixel electrode 118 in row 433 and column j is decreased from the positive voltage Vg1(+) written previously to the voltage Vin at the time $t_2$, but since the period of time is very short, it is not visible as the deviation in display quality.

Subsequently, when the read enable signal /We is changed to the L level at the time $t_3$ in the state that the scanning signal G433 is changed to the H level, the write enable signal We is inverted to the H level. Accordingly, since the transistors 1852 and 1854 in the writing circuit group 180 shown in FIG. 4 are turned on and off, the power supply line 186 is changed to the reference voltage Vr. Accordingly, as shown in FIG. 10C, the resistance $R_1$ specified by the corresponding reference voltage Vr is set between the source and the drain of the transistor 1822 in the writing circuit 182 of each column.

Since the read enable signal /We is changed to the L level, the transistor 1826 of each column is turned off and thus the gate of the transistor 1824 is electrically isolated from the data line 114 but is held to the previous potential Vin by the parasitic capacitor Cs between the gate and the source.

On the other hand, since the write enable signal We is changed to the H level, the transistor 1828 in each column is turned on.

Figure 10B:
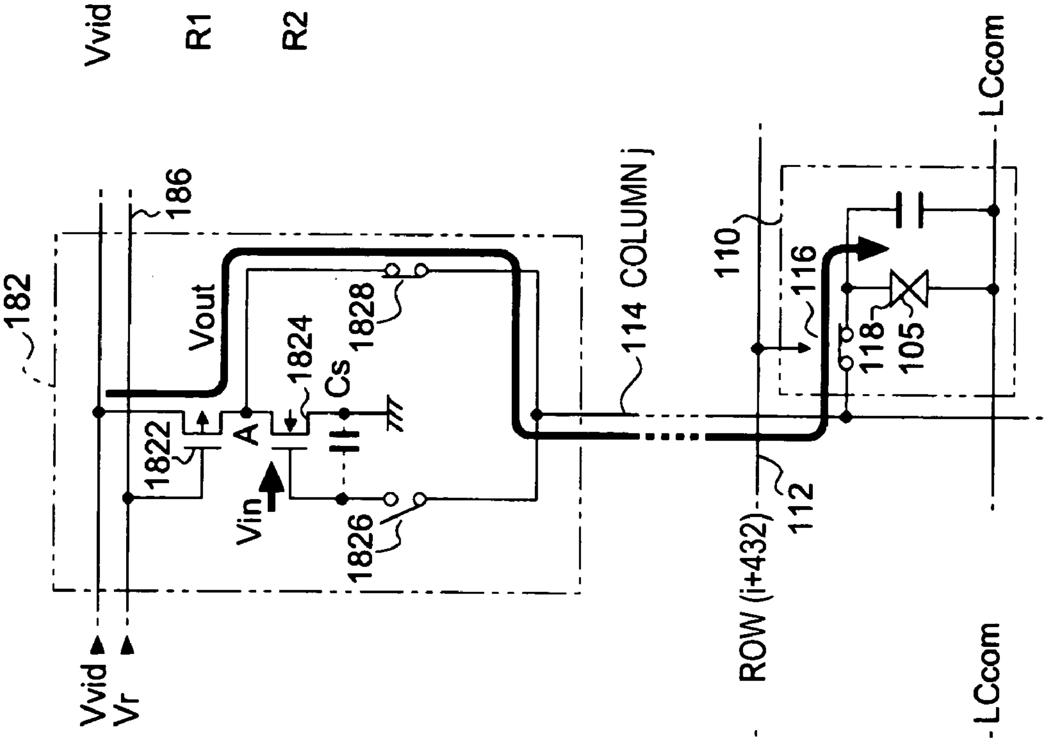
Figure 10C:
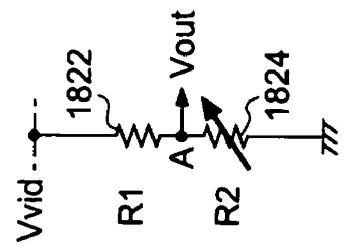

Accordingly, the voltage Vout of the node A is changed to a value, as shown in FIG. 10C, obtained by resistance-dividing the source voltage Vdd by the resistance $R_1$ and the resistance $R_2$ specified in accordance with the held voltage Vin.

As described above, since the node A is designed to have the voltage Vc, the voltage of the node A is lowered from the voltage Vc as the held voltage Vin becomes higher than the reference voltage Vc, when the gate of the transistor 1824 has the voltage Vc and the reference voltage Vr is applied to the gate of the transistor 1822. That is, the transistors 1822 and 1824 serves as an inversion circuit for outputting a negative voltage, obtained by inverting the held voltage Vin about the voltage Vc, to the node A.

The resistance $R_1$ between the source and the drain of the transistor 1822 can be set to a proper value by adjusting the reference voltage Vr. That is, the inversion circuit can be adjusted by the reference voltage Vr so that the potential of the node A becomes the voltage Vg1(−) obtained by inverting the voltage Vg1(+) written to the pixel electrode 118 about the voltage Vc.

Since the read enable signal /We and the write enable signal We are in the H and L levels, respectively, the transistors 1826 and 1828 in the writing circuit 182 are turned off.

Accordingly, in column j, as shown in FIG. 10B, the inverted voltage Vout of the held voltage Vin, that is, the negative voltage Vg1(−) obtained by inverting the positive voltage Vg1(+) written previously about the voltage Vc, is written to the pixel electrode 118 in row 433 and column j through the transistors 1828, the data line 114, and the TFT 116.

When the scanning signal G433 is changed to the L level the time $t_4$, all the TFTs 116 of which the gate is connected to the scanning line of row 433 are turned off. Accordingly, the negative voltage written to the pixel electrode 118 of the pixels in row 433 is held until the corresponding scanning signal G433 is changed again to the H level.

After the time $t_4$ and before the next control signal Pre is changed to the H level, the read enable signal /We is changed to the H level and the write enable signal We which is the inverted signal thereof is changed to the L level. Accordingly, the transistors 1826 and 1828 in the writing circuit 182 of each column are turned on and off, respectively, to wait for the next positive writing operation.

The reading and inverted rewriting operation is simultaneously performed in each column of columns 1 to 1152.

Next, in the first field, the scanning line of row 2 belonging to the upper half area is selected next to the scanning line 112 of row 433 and the positive writing operation in response to the supply of the data signals Vid1 to Vid6 is performed to the pixels 110 in row 433. In this case, in FIGS. 6, 8, and 9, i=2 is set. The operation in the horizontal scanning period in which the scanning line 112 of row 2 is selected is similar to that in the horizontal scanning period in which the scanning line 112 of row 1 is selected. After the precharge to the voltage Vg(+), the sampling signals S1, S2, S3, . . . , and S192 are sequentially and exclusively changed to the H level. Accordingly, the positive writing operation corresponding to the gray scales in response to the supply of the data signals Vid1 to Vid6 is finished to all the pixel electrodes in row 2.

The scanning line of row 434 belonging to the lower half area is selected next to the scanning line 112 of row 2 and the reading and inverted rewriting operation is performed to the pixels 110 in row 434. the reading and inverted rewriting operation to the pixels 110 in the scanning line of row 434 is similar to the reading and inverted rewriting operation to the scanning line of row 433. After the precharge to the voltage Vc, the pixel voltages are read and held through the data lines 114 and then the pixel voltages are inverted and rewritten.

Similarly, the upper half area and the lower half area are alternately selected and the scanning line 112 is selected one by one downward in the selected half area. When the scanning line 112 in the upper half area is selected, the positive writing operation in response to the supply of the data signals Vid1 to Vid6 is performed and when the scanning line 112 in the lower half area is selected, the reading and inverted rewriting operation is performed.

Accordingly, at the time of ending the first field, the data signals Vid1 to Vid6, that is, the positive voltages corresponding to the specified gray scale values, are written to the pixels 110 in rows 1 to 432 of the upper half area. On the other hand, the reading and inverted rewriting operation of reading the positive voltages previously written and inverting and rewriting the read positive voltages is performed to the pixels 110 of in rows 433 to 864 of the lower half area.

Subsequently, in the second field, the order of selecting the scanning lines 112 is similar to that of the first field, but the positive writing operation and the reading and inverted rewriting operation are interchanged. That is, when the scanning line 112 in the upper half area 112 is selected, the reading and inverted rewriting operation of reading the positive voltages written in the first field and inverting and rewriting the read positive voltages is performed, and when the scanning line 112 in the lower half area is selected, the positive writing operation in response to the supply of the data signals Vid1 to Vid6 is performed.

Accordingly, at the time of ending the second field, the reading and inverted rewriting operation of reading the positive voltages written in the first field and inverting and rewriting the read positive voltages is performed to the pixels 110 in rows 1 to 432 of the upper half area and the positive voltages corresponding to the specified gray scale values are written to the pixels 110 in rows 433 to 864 of the lower half area.

Figure 11:
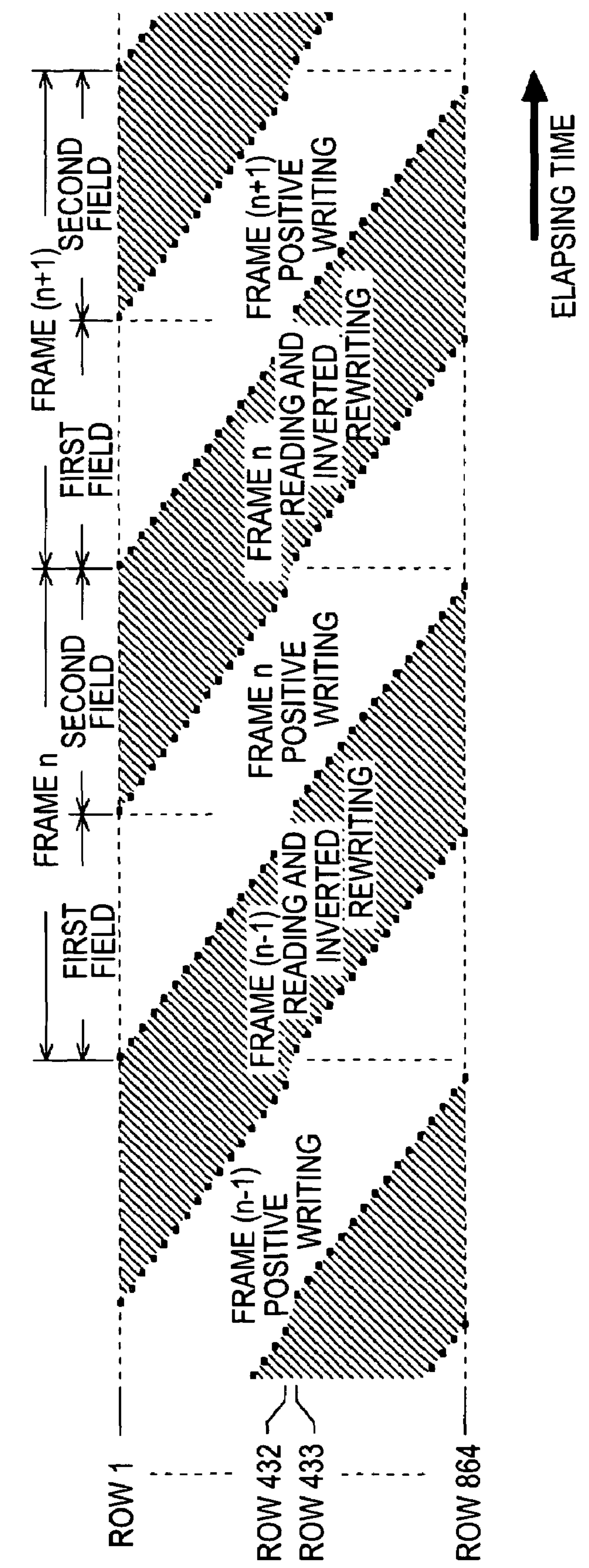
FIG. 11 is a diagram illustrating statuses of pixels in the electro-optical device.

Here, when it is assumed that the number of frames hitherto is n and the scanning line belonging to the lower half area in the first field of the next (n+1) frame is selected, as shown in FIG. 11, the reading and inverted rewriting operation of reading the positive voltages written in the second field of frame n and inverting and rewriting the read positive voltages is performed. Accordingly, in this embodiment, since the pixel area to which the positive voltages are written and the pixel area to which the negative voltages are written occupy 50%, the polarity of the data lines 114 after the writing operation does not lean toward one polarity and thus the non-uniformity of the display is prevented.

In this embodiment, the image data Vid supplied from an external device is converted into analog data signals and are written to the pixel electrodes 118 with a positive polarity. After the lapse of a half frame, the positive voltages previously written are read and the read positive voltages are read and rewritten with a negative polarity. Accordingly, it is not necessary to supply two times the image data Vid to the same pixels. As a result, the memory for storing the supplied image data Vid is not required. In this embodiment, since it is sufficient that the image data are converted into analog signals and it is not necessary to convert the image data into negative signals, it is possible to further simplify the configuration.

In the writing circuit group 180, since the signal line 186 is changed to the H level when the read enable signal /We is in the H level, the transistor 1822 in the writing circuit 182 of each column is turned off. Accordingly, as shown in FIG. 10A, the passing current is prevented from flowing through the transistors 1822 and 1824, thereby preventing the increase in current consumption.

When the read enable signal /We is changed to the L level, the transistor 1822 in the writing circuit 182 of each column is turned on, thereby allowing the passing current to flow. However, the period of time when the inverted negative voltages are written to the pixel electrodes 118 is very short. Accordingly, when the period of time when the read enable signal /We is in the L level is shortened after the condition that the inverted rewriting operation is finished is accomplished, it is possible to suppress the increase in power consumption due to the flowing of the passing current as much as possible.

In this embodiment, right before the data signals Vid1 to Vid6 supplied to the image signal lines 120 are sampled to the data lines 114 of each column, the data lines are precharged to the voltage Vg(+) which is a center of the positive voltage range. Accordingly, it is possible to reduce and uniform the burden when the data signals are sampled to the data lines in response to the sampling signal.

Specifically, the negative voltages written in the previous field remain in the data lines 114 of each column due to the parasitic capacitor thereof. Accordingly, without the precharge operation, the voltage has to be changed from the remaining negative voltage to the positive voltage corresponding to the data signal at a time and the remaining negative voltage is not constant depending upon the displayed details in the previous frame. On the contrary, in this embodiment, since the data lines 114 are precharged to the voltage Vg(+) right before sampling the data signals, the variation in voltage is not necessarily great so as to depend on only the gray scale value in the current frame.

In this embodiment, since the data lines 114 are precharged to the voltage Vc which is a reference of polarity right before the positive voltages written to the pixel electrodes 118 are read out. Accordingly, the read voltage Vin is not affected by the remaining voltage due to the parasitic capacitor.

In this embodiment, the two different precharge operations are performed by the precharge switches 161 disposed in the columns.

Instead of disposing such precharge switches 161, the voltage corresponding to the precharge signal Vpre may be supplied to the image signal lines 120 in the period of time when the control signal Pre is in the H level to turn on the sampling switches 151, which is referred to as a video precharge.

Now, the operating range of the transistor 1824 of each writing circuit 182 will be described with reference to FIG. 12.

Figure 12A:
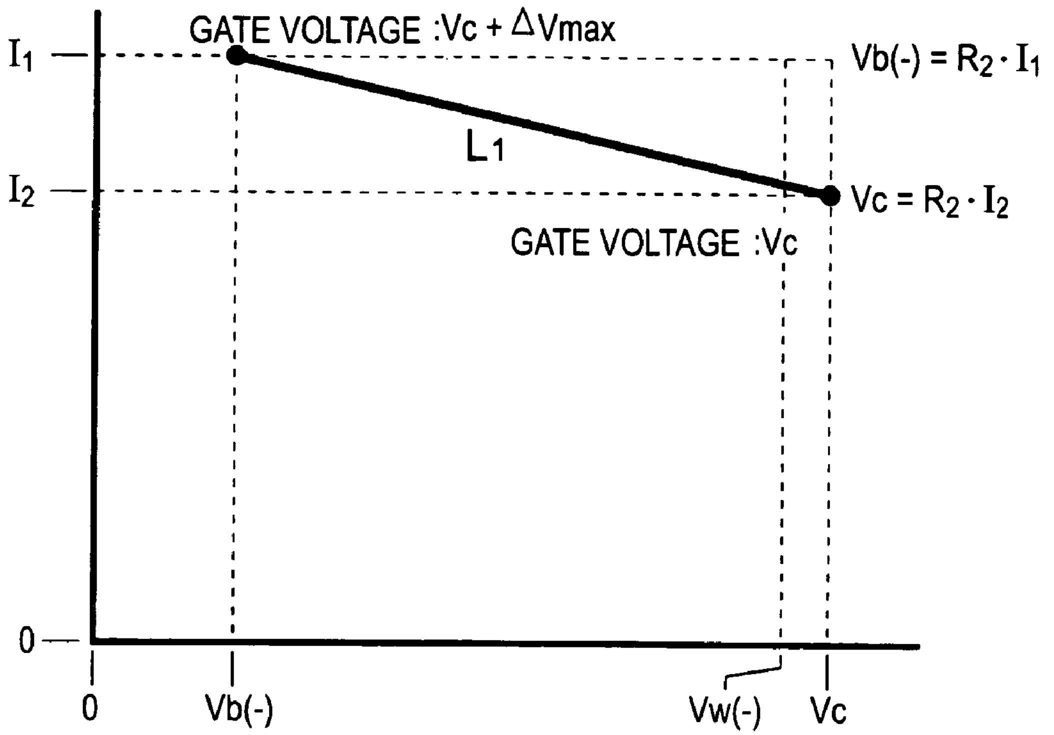
FIGS. 12A and 12B are diagrams illustrating characteristics of a transistor in the writing circuit.

FIG. 12A is a diagram illustrating a relation between the drain voltage (horizontal axis) and the source-drain current (vertical axis) in the transistor 1824. The negative voltage range in the inverted rewriting operation, strictly speaking, is the voltage range from the voltage Vb(−) to the voltage Vw(−), which is obtained by inverting the voltage range (the hatched region in FIG. 9) from the positive voltage Vb(+) corresponding to black to the positive voltage Vw(+) corresponding to white about the voltage Vc, but the voltage Vc is considered as the upper limit for the purpose of simple description.

As described above, when the gate of the transistor 1824 is changed to the voltage Vc, it is necessary to change the drain thereof to the voltage Vc. Accordingly, it is preferable that the voltage Vc of the drain is equal to the multiplication of the resistance $R_2$ (see FIG. 10C) between the source and the drain when the voltage of the gate is Vc and the current value $I_2$ flowing between the source and the drain at that time.

On the other hand, it is preferable that the lower limit voltage Vb(−) of the drain is equal to the multiplication of the resistance $R_2$ when the voltage Vc+ΔVmax varied by the maximum variation ΔVmax from the precharge voltage Vc is applied to the gate and the current value $I_2$ flowing between the source and the drain at that time.

The maximum variation ΔVmax occurs when the positive voltage Vb(+) is written in the previous field. The current values $I_1$ and $I_2$ depend on the resistance $R_1$ between the source and the drain of the transistor 1822.

Accordingly, in the above-mentioned embodiment, as shown in FIG. 12A, a characteristic $L_1$ which is an excellent linearity in a region where the current flowing between the source and the drain is relatively large is required for the transistor 1822. the sum Cpix of the capacitance of the pixel capacitor and the capacitance of the storage capacitor is greater than the capacitance of the parasitic capacitor Cs, the slope of the characteristic $L_1$ is decreased.

When the transistor 1822 is intended to have the characteristic, that is, when the same thin film transistor as the switching TFT 116 is formed between the pixel electrode 118 and the data line 114, it is necessary to set the threshold value of the transistor to be a very high value (to be close to the voltage Vc).

Figure 13:
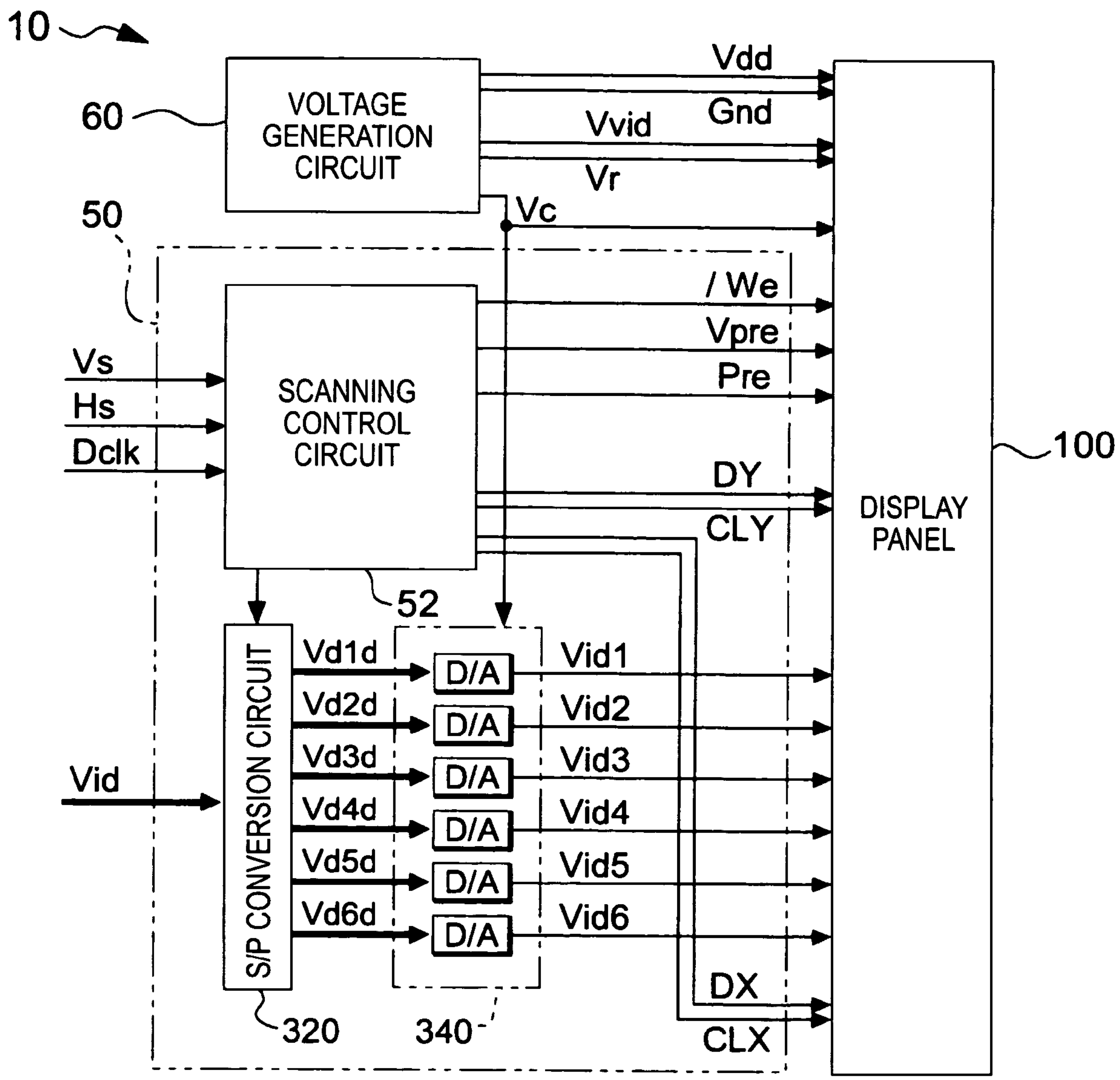
FIG. 13 is a block diagram illustrating a configuration of an electro-optical device according to a modified example of the invention.

Therefore, a modified example in which such a problem is improved will be described. FIG. 13 is a block diagram illustrating a configuration of the electro-optical device 10 according to the modified example and FIG. 14 is a diagram illustrating a configuration of a display panel 100 according to the modified example.

Figure 14:
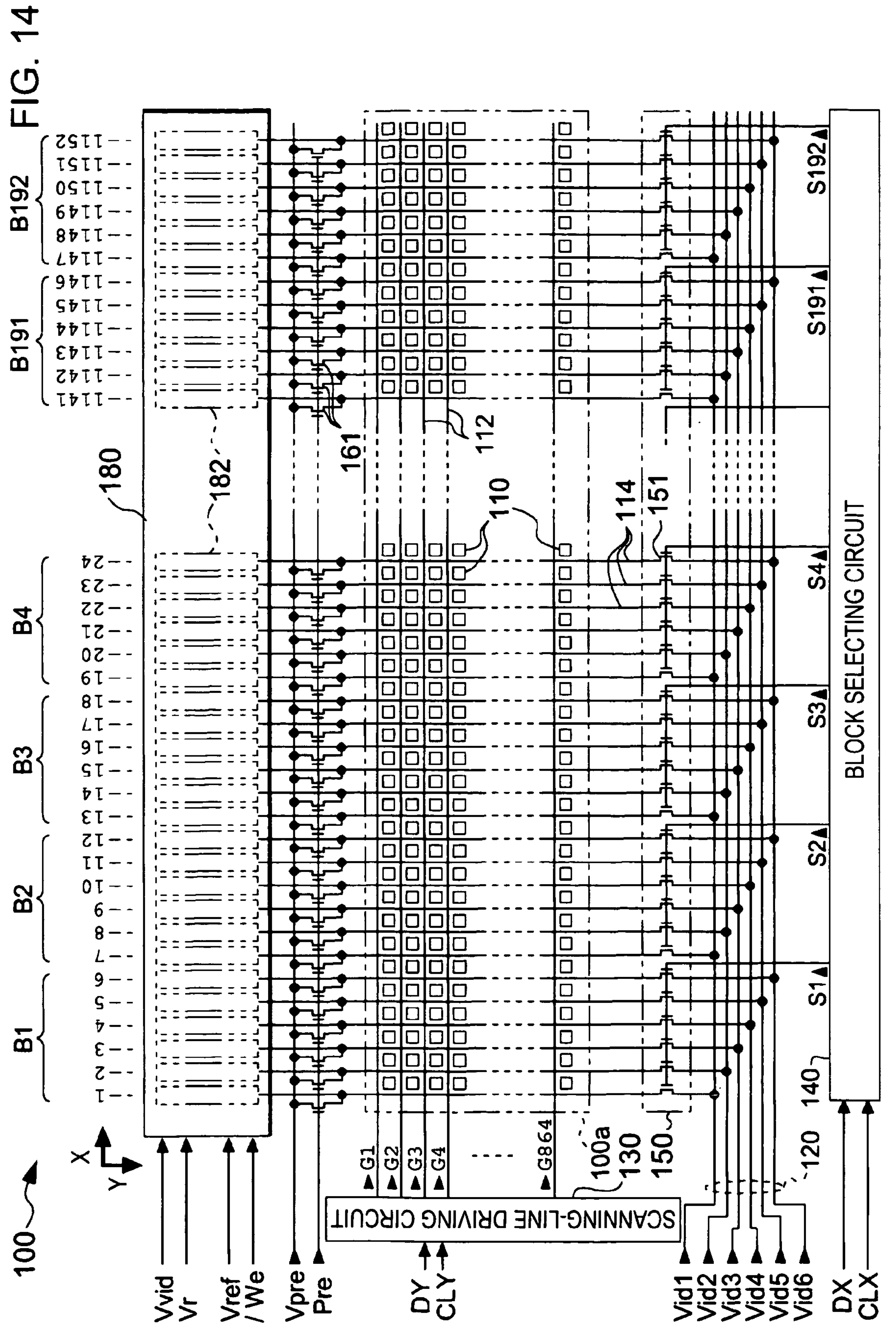
FIG. 14 is a diagram illustrating a configuration of a display panel according to a modified example.

FIGS. 13 and 14 are different from FIGS. 1 and 2 in that the voltage generating circuit 60 supplies the reference voltage Vc to the writing circuit group 180 of the display panel 100.

Figure 15:
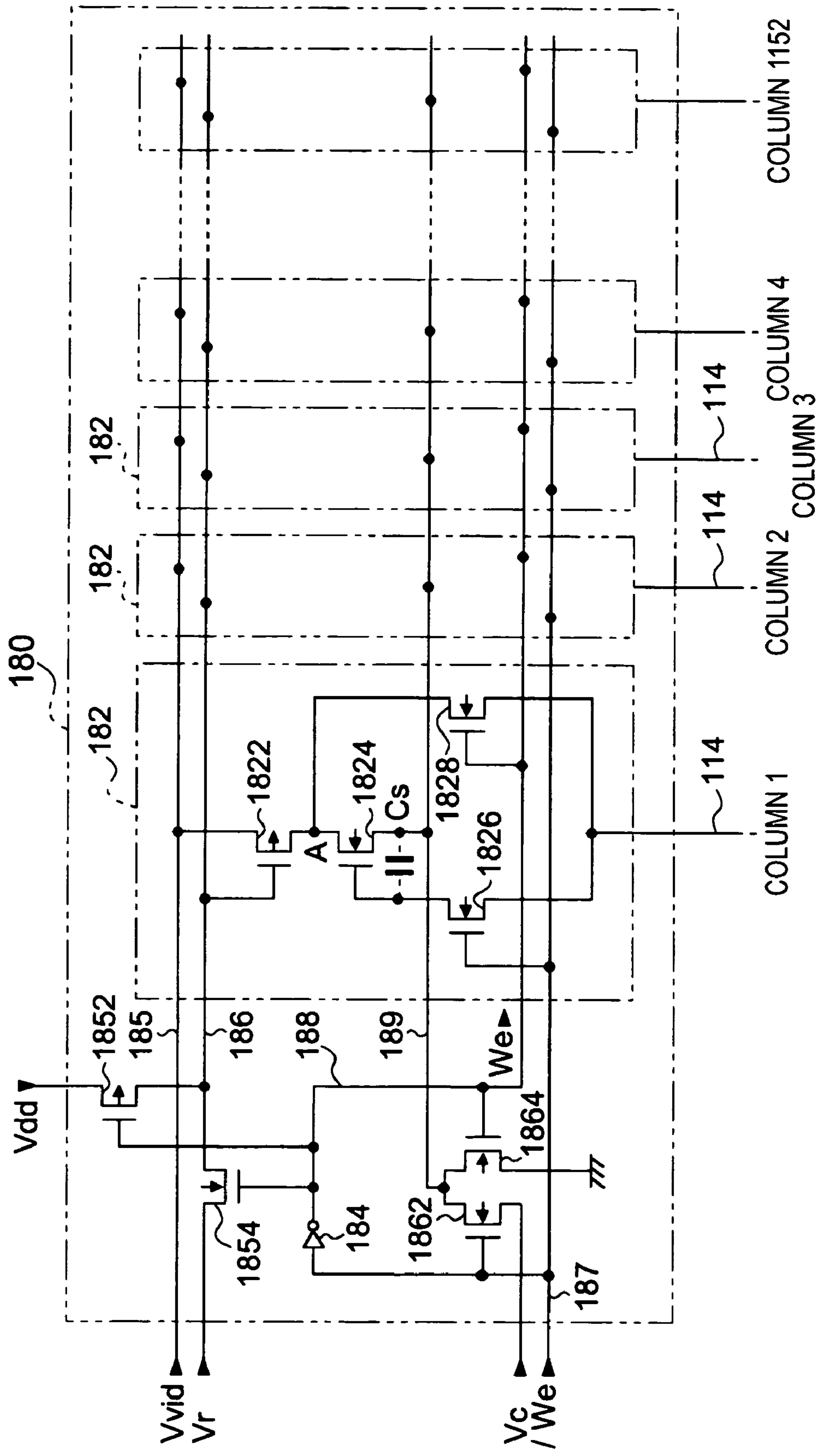
FIG. 15 is a diagram illustrating a configuration of a writing circuit group according to a modified example.

The configuration of the writing circuit group 180 according to the modified example is as shown in FIG. 15 and is different from that shown in FIG. 4 by a first difference that n-channel transistors 1862 and 1864 which are exclusively turned on and off to set the signal line 189 to any one of the potential Vc and the ground potential Gnd is provided and a second difference that the source of the transistor 1824 is connected to the signal line 189 in the writing circuit 182 of each column.

The first difference is described in detail. The gate of the transistor 1862 is connected to the signal line 187 and the gate of the transistor 1864 is connected to the signal line 188. Accordingly, since the transistors 1862 and 1864 are turned on and off when the read enable signal /We is in the H level (when the write enable signal We is in the L level), the signal line 189 is set to the voltage Vc. On the other hand, since the transistors 1862 and 1864 are turned on and off when the read enable signal /We is in the L level (when the write enable signal We is in the H level), the signal line 189 is changed to the ground potential Gnd.

Therefore, when the read enable signal /We is in the H level, the source of the transistor 1824 in the writing circuit 182 of each column is changed to the voltage Vc. Accordingly, when the scanning signal of any one scanning line 112 is changed to the H level, only the voltage variation ΔV, not the voltage of the data line 114, is held by the capacitor Cs.

When the read enable signal /We is changed to the L level, the source of the transistor 1824 is lowered to the ground potential Gnd. Accordingly, the gate voltage Vin of the transistor 1824 is changed to the voltage variation ΔV.

Figure 12B:
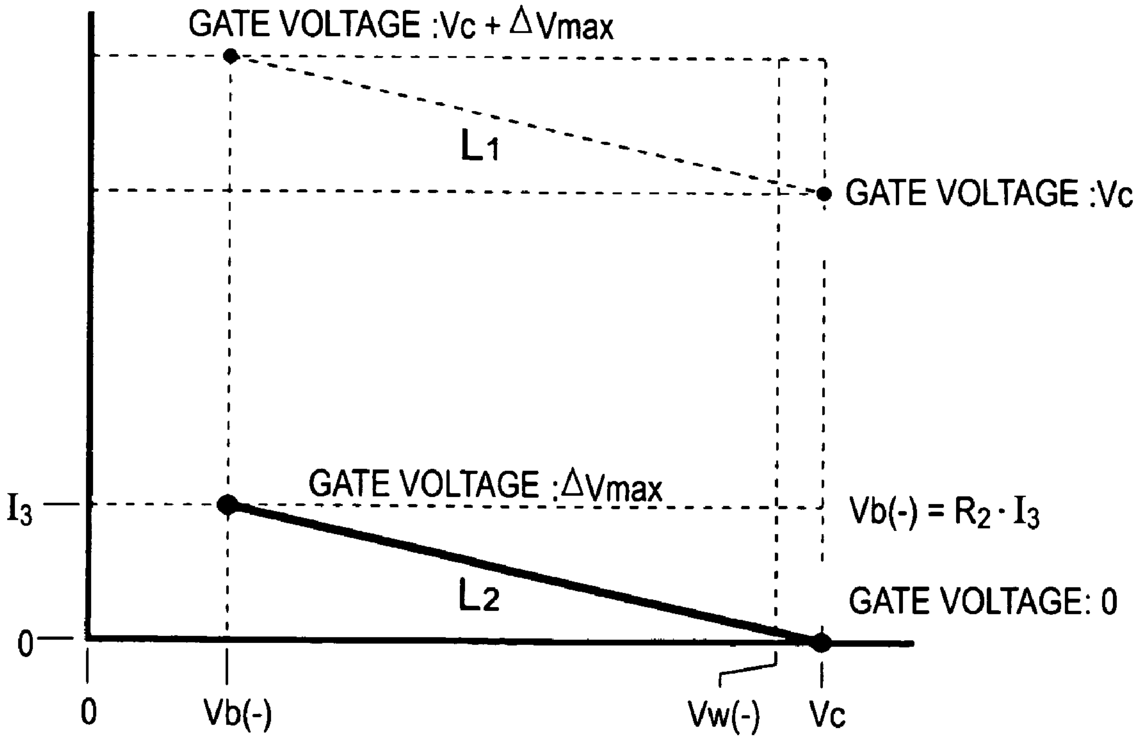

Therefore, the characteristic required for the transistor 1824 is alleviated to the characteristic $L_2$ shown in FIG. 12B. That is, the characteristic $L_2$ is obtained by connecting straightly a point that the node A (that is, the drain) which is resistance-divided by the resistance between the source and the drain and the resistance $R_1$ has the voltage Vc when the gate of the transistor 1824 has the ground potential Gnd (zero voltage) in consideration of the upper limit of the negative voltage range in the inverted rewriting operation and a point that the node A which is resistance-divided by the resistance $R_2$ between the source and the drain and the resistance $R_1$ has the voltage Vb(+) when the gate of the transistor 1824 has the potential ΔVmax in consideration of the lower limit of the negative voltage range.

That is, since the characteristic L2 in which the absolute value of the current flowing between the source and the drain decreases with the variation of gate voltage is accomplished, the threshold value of the transistor 1824 in the writing circuit 182 of each column can be set to a general low value in this modified example.

In this modified example, the signal line 189 is set to the voltage Vc when the read enable signal /We is in the H level and is set to the potential Gnd when the read enable signal /We is in the L level, which is intended to reduce the current between the source and the drain of the transistor 1824 with the variation in gate voltage. Accordingly, on the premise that the linear variation of the voltage of the drain (node A) is guaranteed, it is preferable that the voltage of the signal line 189 is decreased when the read enable signal /We is changed from the H level to the L level.

In the embodiment and modified example described above, the positive voltages of the data signals based on the image data are written, the voltages are read after the lapse of the corresponding field, and the read voltages are inverted about the voltage Vc, thereby writing the negative voltages. On the contrary, the negative voltages of the data signals based on the image data may be written, the negative voltages may be read after the lapse of the corresponding field, and the read voltage may be inverted about the voltage Vc, thereby writing the positive voltages.

In the aforementioned description, the threshold characteristic is not considered in the TFTs 116 or various transistors. A variety of voltages may be set in consideration such a characteristic.

In the embodiment and modified example described above, the voltage LCcom applied to the common electrode 108 is made to be equal to the voltage Vc which is a reference of polarity inversion. However, since the sampling switch 151 is a thin film transistors equivalent to the TFT 116 for switching the pixel electrode 118, a phenomenon (referred to as push-down, burst, field through, or the like) that the potential of the drain (pixel electrode 118) is lowered at the time of turning OFF the transistor occurs due to the parasitic capacitor between the gate and the drain of the TFT constituting the sampling switch 151. Since the alternating driving is performed in the pixel capacitor in principle so as to prevent the deterioration of the liquid crystal, the alternate writing operation with the same gray scale in the high potential (positive potential) side and the low potential (negative potential) side is performed to the common electrode 108. However, when the alternate writing operation is performed in the state that the voltage LCcom is made to be equal to the voltage Vc, the effective voltage value of he pixel capacitor is greater in the negative writing operation than in the positive writing operation due to the push-down. Accordingly, the voltage LCcom of the common electrode 108 may be set slightly lower than the voltage Vc which is an amplitude center of the data signals so that the effective voltage value of the pixel capacitor is constant in the positive writing operation and the negative writing operation with the same gray scale.

In the embodiment and modified example described above, the vertical scanning direction is a downward direction of G1→G864 and the horizontal scanning direction is a right direction of S1→S192. However, in order to cope with a projector or a rotatable display to be described later, the scanning directions may be changed.

In the above-mentioned embodiment, the phase-development driving method of making the six data lines 114 into a block and converting the block into six channels of the image data Vd1*d* to Vd6*d* is employed. However, the number of channels and the number of data lines subjected to simultaneous application (that is, the number of data lines belonging to a block) are not limited to "6", and the phase-development driving method may not be employed.

When the effective voltage value of the pixel capacitor is small, the normally black mode of displaying black may be used instead of the normally white mode of displaying white.

In the above-mentioned embodiment, the TN type liquid crystal has been used. However, bi-stable type liquid crystal having a memory characteristic such as a BTN (Bi-stable Twisted Nematic) type and a ferroelectric type, polymer dispersion type liquid crystal, and GH (Guest Host) type liquid crystal in which dyes (Guest) having anisotropy in absorbing visible rays in the major axis direction and the minor axis direction are dissolved in liquid crystal (Host) having a constant arrangement of molecules and the dyes molecules are arranged parallel to the liquid crystal molecules may be used.

A vertical alignment (homeotropic alignment) mode in which the liquid crystal molecules are aligned perpendicular to both substrates at the time of non-application of a voltage and the liquid crystal molecules are aligned parallel to both substrates at the time of application of a voltage may be employed. Alternatively, a horizontal alignment (homogeneous alignment) mode in which the liquid crystal molecules are aligned parallel to both substrates at the time of non-application of a voltage and the liquid crystal molecules are aligned perpendicular to both substrates at the time of application of a voltage may be employed. In this way, the invention can employ a variety of liquid crystal or alignment modes.

Figure 16:
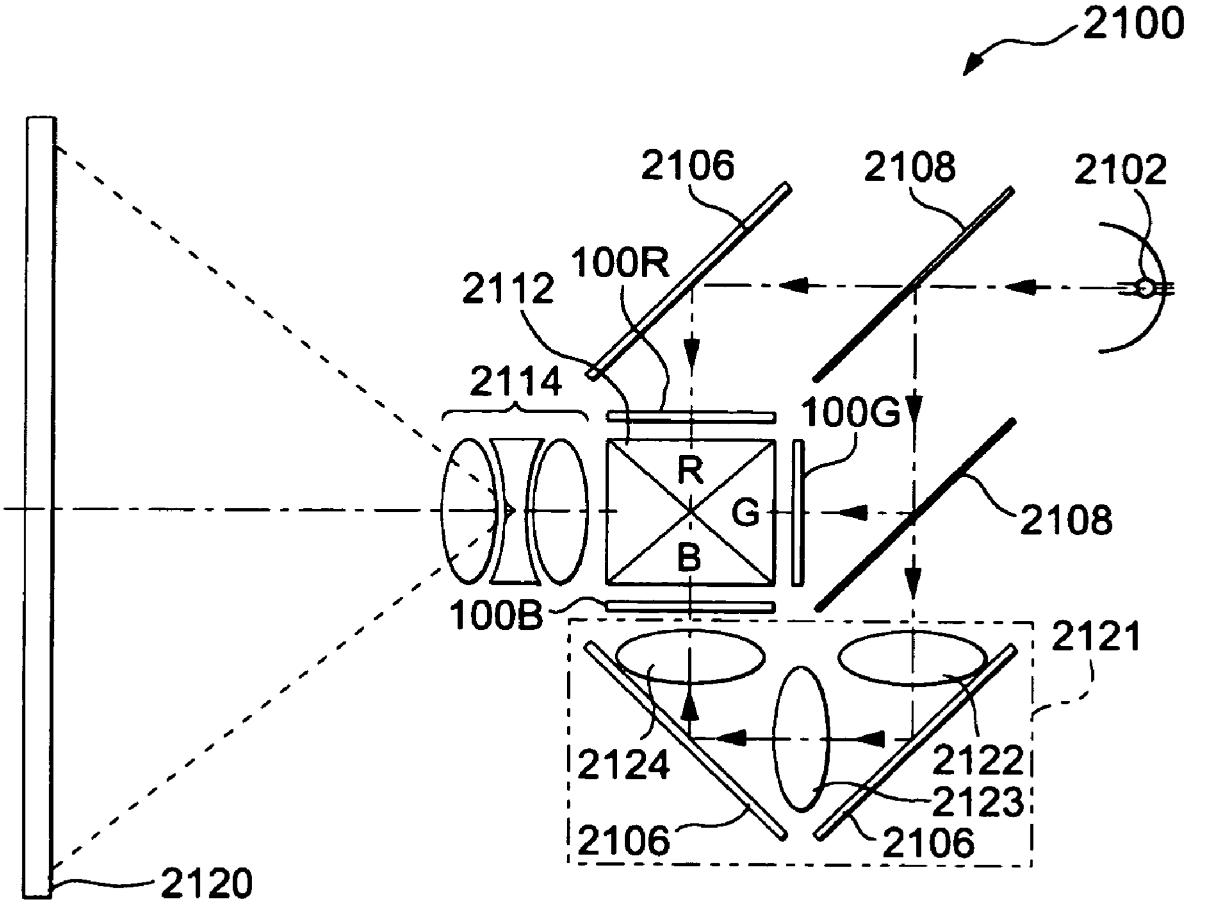
FIG. 16 is a diagram illustrating a configuration of a projector which is an example of an electronic apparatus employing the electro-optical device.

Next, a projector having the above-mentioned display panel 100 as a light valve will be described as an example of an electronic apparatus employing the electro-optical devices according to the embodiments. FIG. 16 is a plan view illustrating a configuration of the projector. As shown in FIG. 16, a lamp unit 2102 including a white light source such as a halogen lamp is disposed in the projector 2100. Projection light emitted from the lamp unit 2102 is divided into light components corresponding to three primary colors of R (red), G (green), and B (blue) by three sheets of mirrors 2106 and two sheets of dichroic mirrors 2108 and the light components are guided to light valves 100R, 100G, and 100B corresponding to the primary colors. Since the B light component has an optical path longer than the R and G light components, the B light component is guided through a relay lens system 2121 including an incident lens 2122, a relay lens 2123, and an exit lens 2124 so as to prevent the loss of light.

The light valves 100R, 100G, and 100B have the same configuration as the display panel 100 described in the embodiments and are driven in response to the image signals corresponding to the R, G, and B supplied from the processing circuit (not shown in FIG. 16). That is, three electro-optical devices including the display panel 100 are provided to correspond to the three primary colors of R, G, and B.

The light components modulated by the light valves 100R, 100G, and 100B are incident on the dichroic prism 2112 in three directions, respectively. In the dichroic prism 2112, the R and B light components are refracted by 90 degrees, but the G light component goes straightly. Accordingly, the light components are synthesized and a color image is projected to a screen 2120 through a projection lens 2114.

Since the light components corresponding to the primary colors of R, G, and B are incident on the light valves 100R, 100G, and 100B through dichroic mirrors 2108, respectively, it is not necessary to provide color filters thereto. The images passing through the light valves 100R and 100B are projected after being reflected by the dichroic prism 2112, but the image passing through the light valve 100G passes through the dichroic prism without being reflected. Accordingly, the horizontal scanning directions of the light valve 100R and 100B are opposite to the horizontal scanning direction of the light valve 100G, thereby displaying an image of which the left and right are inverted.

In addition to the example shown in FIG. 16, examples of the electronic apparatus can include a television, a view finder type or monitor direct vision-type video tape recorder, a car navigation apparatus, a pager, an electronic pocket book, an electronic calculator, a word processor, a work station, a television phone, a POS terminal, a digital still camera, a mobile phone, an apparatus having a touch panel, and the like. The above-mentioned electro-optical device can apply to the electronic apparatuses.

The entire disclosure of Japanese Patent Application Nos. 2005-113149, filed Apr. 11, 2005, and 2006-021975, filed Jan. 31, 2006, are expressly incorporated by reference herein.

What is claimed is:

1. A writing circuit of an electro-optical device having a plurality of scanning lines, a plurality of data lines, and a plurality of pixels disposed to correspond to intersections between the plurality of scanning lines and the plurality of data lines, each pixel including:
- a pixel capacitor having a pixel electrode and a common electrode opposed to the pixel electrode; and
- a switching element for electrically connecting the corresponding data line to the pixel electrode when the corresponding scanning line is selected, the writing circuit comprising:
- an inversion circuit that, during a period of time when one scanning line of the plurality of scanning lines is selected, maintains a voltage between a potential of the data line and a predetermined potential for a predetermined time, inverts the maintained voltage with respect to a reference potential, and applies the inverted voltage to the data line after the lapse of the predetermined time, wherein the inversion circuit comprises:
- a first transistor with a predetermined resistance between the source and the drain after the lapse of the predetermined time in the period of time when one scanning line of the plurality of scanning lines is selected;
- a second transistor including a gate supplied with a voltage held by a holding element, and wherein a potential difference between a predetermined high potential and a ground potential is resistance-divided by the first and second transistors and the divided potential difference is used as the inverted voltage.

2. The writing circuit according to claim 1, wherein the plurality of data lines are precharged to the reference potential before one scanning line of the plurality of scanning lines is selected.

3. The writing circuit according to claim 1, wherein the potential of the data lines during the predetermined time is a potential after being changed from the reference potential by the voltage held in the pixel capacitor.

4. The writing circuit according to claim 1, wherein the source and the drain of the first transistor is electrically disconnected from each other for the predetermined time in the period of time when one scanning line of the plurality of scanning lines is selected.

5. The writing circuit according to claim 1, wherein the holding element:
- holds a voltage between the source and the drain of the second transistor,
- sets the source of the second transistor to a predetermined potential for a predetermined time in the period of time when one scanning line of the plurality of scanning lines is selected, and
- shifts the source of the second transistor to the inverted voltage about the reference potential among the high potential and the ground potential after the lapse of the predetermined time in the period of time when one scanning lines of the plurality of scanning lines is selected.

6. The writing circuit according to claim 5, wherein the source of the second transistor is set to the reference potential for the predetermined time in the period of time when one scanning line of the plurality of scanning lines is selected, and is then set to the ground potential after the lapse of the predetermined time.

7. An electro-optical device comprising:
- a plurality of scanning lines;
- a plurality of data lines;
- a plurality of pixels disposed to correspond to intersections between the plurality of scanning lines and the plurality of data lines, each pixel including:
- a pixel capacitor having a pixel electrode and a common electrode opposed to the pixel electrode; and
- a switching element for electrically connecting the pixel electrode to the corresponding data line when the corresponding scanning line is selected;
- a scanning-line driving circuit for selecting the plurality of scanning lines in a predetermined order; and
- a data-line driving circuit for supplying a voltage to the plurality of data lines, the data-line driving circuit applying, in a first field, one of a high-potential voltage and a low-potential voltage about a predetermined reference potential, which is a voltage corresponding to a gray scale of the pixels corresponding to the selected scanning line; and an inversion circuit that, for a period of time when the scanning line is selected in a second field subsequent to the first field:

holds a voltage between the data line and a predetermined potential until a predetermined time after the scanning line is selected and inverts the held voltage about the reference potential and applies the inverted voltage to the data line.

8. An electronic apparatus comprising the electro-optical device according to claim 7.

* * * * *